(12) United States Patent
Choi et al.

(10) Patent No.: US 12,540,747 B2
(45) Date of Patent: Feb. 3, 2026

(54) AIR CONDITIONER AND OPERATION METHOD THEREOF

(71) Applicant: LG ELECTRONICS INC., Seoul (KR)

(72) Inventors: Changmin Choi, Seoul (KR); Soonyong Choi, Seoul (KR); Juntae Kim, Seoul (KR); Hyuntak Lee, Seoul (KR); Jinsik Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 503 days.

(21) Appl. No.: 17/959,441

(22) Filed: Oct. 4, 2022

(65) Prior Publication Data

US 2023/0109896 A1 Apr. 13, 2023

(30) Foreign Application Priority Data

Oct. 7, 2021 (KR) .......................... 10-2021-0133405

(51) Int. Cl.
*F24F 11/65* (2018.01)
*F24F 11/30* (2018.01)

(52) U.S. Cl.
CPC .............. *F24F 11/65* (2018.01); *F24F 11/30* (2018.01)

(58) Field of Classification Search
CPC .................................. F24F 11/65; F24F 11/30
See application file for complete search history.

(56) References Cited

U.S. PATENT DOCUMENTS

| 2006/0123809 A1* | 6/2006 | Ha | F25B 13/00 62/149 |
| 2016/0004297 A1* | 1/2016 | Kazuno | G06Q 30/06 713/320 |
| 2019/0258237 A1* | 8/2019 | Buda | F24F 11/49 |

FOREIGN PATENT DOCUMENTS

| JP | 2020-134051 | 8/2020 |
| KR | 10-1757446 | 7/2017 |
| KR | 10-2020-0089196 | 7/2020 |
| KR | 10-2021-0093666 | 7/2021 |

OTHER PUBLICATIONS

European Search Report issued in Application No. 22199935.2 dated May 11, 2023.

* cited by examiner

*Primary Examiner* — Larry L Furdge
(74) *Attorney, Agent, or Firm* — KED & ASSOCIATES

(57) ABSTRACT

An air conditioner including an outdoor unit including a compressor; at least one indoor unit; a storage that stores a previously learned control algorithm to control a component; and a controller. When an operation mode is set to a first mode, the controller controls the outdoor unit or the at least one indoor unit regardless of the control algorithm, and based on first data acquired while the first mode is set, a power quantity learning model related to an actual power quantity consumed by the air conditioner is set. When the operation mode is set to a second mode, the controller controls the outdoor unit or the at least one indoor unit based on the control algorithm. An estimated power quantity and an actual power quantity consumed by the air conditioner while the second mode is set may be calculated.

24 Claims, 21 Drawing Sheets

| Cluster level | Increase (by 7 or more people) | Increase (by 4 to 6 people) | Average (by −3 to +3 people) | Decrease (by −4 to +6 people) | Decrease (by −7 people) |
|---|---|---|---|---|---|
| Lv1 | A1 | A2 | A2 | A3 | A4 |
| Lv2 | A1 | A1 | A1 | A2 | A3 |
| Lv3 | A0 | A1 | A1 | A1 | A2 |
| Lv4 | A0 | A0 | A1 | A1 | A2 |
| Lv5 | A0 | A0 | A0 | A1 | A1 |

AIR CONDITIONER AND OPERATION METHOD THEREOF

CROSS-REFERENCE TO RELATED APPLICATION(S)

This application claims priority under 35 U.S.C. § 119 to Korean Application No. KR 10-2021-0133405 filed in Korea on Oct. 7, 2021, whose entire disclosure(s) is/are hereby incorporated by reference.

BACKGROUND

1. Field

The present disclosure relates to an air conditioner and an operation method thereof, and more particularly, to an air conditioner capable of providing a user with a power quantity to be used by the air conditioner and an operation method thereof.

2. Background

An air conditioner is installed to provide a more comfortable interior environment for humans by discharging cold or warm air into an indoor space to adjust the room temperature and purify the indoor air. Typically, the air conditioner includes an indoor unit composed of a heat exchanger and installed indoors, and an outdoor unit composed of a compressor, a heat exchanger, etc., and supplying refrigerant to the indoor unit.

In recent years, electronic devices used at home are increasingly diversified for convenience of users, and various automation systems are used to increase productivity in various industrial fields. In addition, as temperature gradually increases due to climate change such as global warming, the number and time of operations of an air conditioner are also gradually increasing. For these reasons, more and more power is consumed not only at home but also in entire industries, resulting in significant electricity bills.

In order to solve these problems, researches have been actively conducted to provide a comfortable indoor environment while reducing power consumption of the air conditioner. For example, the air conditioner operates according to a target temperature set by a user in an operation mode where heating or cooling performance is prioritized, and operates by varying the target temperature depending on a situation in an operation mode where power consumption reduction is prioritized.

Meanwhile, in general, the user is able to check a power quantity used by the air conditioner by repeatedly checking a value of a watt-hour meter placed at home or in a building or by using a system that accumulates and manages a power quantity consumed by the air conditioner in conjunction with the watt-hour meter, as similarly as disclosed in Related Art 1 (Korean Patent Application Publication. 10-2020-0089196). In this case, the user can only check a power quantity actually used by the air conditioner for a predetermined time in a specific operation mode, and it is difficult to accurately determine how much power consumption can be reduced in the specific operation mode compared to other operation modes under the same conditions.

(Patent Document 1) KR 10-2020-0089196 A.

BRIEF DESCRIPTION OF THE DRAWINGS

Embodiments will be described in detail with reference to the following drawings in which like reference numerals refer to like elements, and wherein.

DETAILED DESCRIPTION

Figure 1:
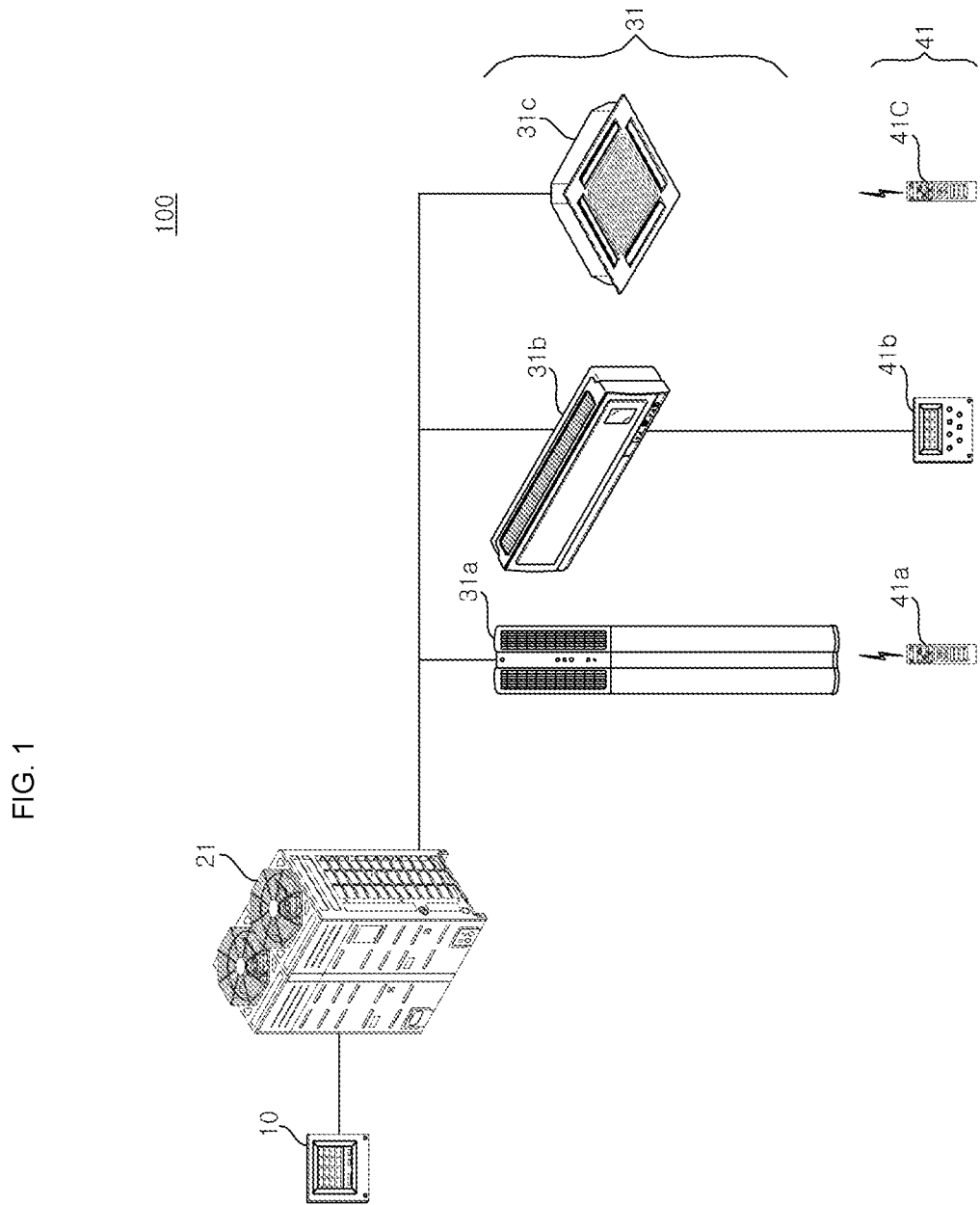
FIG. 1 is a diagram illustrating a configuration of an air conditioner according to an embodiment of the present disclosure.

Hereinafter, the present disclosure will be described in detail with reference to the drawings. In the drawings, in order to clearly and briefly describe the present disclosure, parts which are not related to the description will be omitted and, in the following description of the embodiments, the same or similar elements are denoted by the same reference numerals even though they are depicted in different drawings.

The terms "module" and "unit" used to signify components are used herein to aid in the understanding of the components and thus they should not be considered as having specific meanings or roles. Accordingly, the terms "module" and "unit" may be used interchangeably.

It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

It will be understood that, although the terms first, second, etc., may be used herein to describe various elements, these elements should not be limited by these terms. These terms are only used to distinguish one element from another.

Hereinafter, the present disclosure will be described with reference to the drawings for explaining a method of controlling an air conditioner according to embodiments of the present disclosure.

FIG. 1 is a diagram illustrating a configuration of an air conditioner according to an embodiment of the present disclosure, Referring to FIG. 1, an air conditioner 100 according to an embodiment of the present disclosure may include an outdoor unit 21 and at least one indoor unit 31 connected to the outdoor unit 21. A plurality of indoor units 31 may be connected to one outdoor unit 21, and the number of indoor units 31 connected to one outdoor unit 21 is not limited to the drawings.

An indoor unit 31 may include at least one of a stand-type indoor unit 31a, a wall-mounted indoor unit 31b, and a ceiling-type indoor unit 31c.

Meanwhile, the air conditioner 100 may further include at least one of a ventilator, an air purifier, a humidifier, and a heater, and may operate in conjunction with operations of the indoor unit 31 and the outdoor unit 21.

The outdoor unit 21 may include a compressor (not shown) receiving refrigerant and compressing the received refrigerant, an outdoor heat exchanger (not shown) exchanging heat between refrigerant and outdoor air, an accumulator (not shown) extracting a gaseous refrigerant from a supplied refrigerant and supplying the extracted gaseous refrigerant to the compressor, and a four-way valve (not shown) for selecting a flow path of refrigerant depending on a heating operation. In addition, the outdoor unit 21 may further include a plurality of sensors, valves, oil collecting parts, etc.

The outdoor unit 21 may operate the compressor and the outdoor heat exchanger, which are provided therein, to compress or perform heat exchange on refrigerant according to a setting or to supply refrigerant to the indoor unit 31. The outdoor unit 21 may be driven upon demand by a central controller (not shown) or the indoor unit 31. In this case, as a cooling/heating capacity of the air conditioner 100 varies in response to the indoor unit 31 being driven, the number of driven outdoor units and the number of driven compressors installed in outdoor units may be changed.

In this case, the outdoor unit 21 may supply a compressed refrigerant to the indoor unit 31 connected thereto.

The indoor unit 31 may receive refrigerant from the outdoor unit 21 and discharge cold or hot air into an indoor space. The indoor unit 31 may include an indoor heat exchanger (not shown), an indoor unit fan (not shown), an expansion valve (not shown) for expanding a supplied refrigerant, and a plurality of sensors (not shown).

In this case, the outdoor unit 21 and the indoor unit 31 may be connected to each other via a communication line to transmit and receive data. In addition, the outdoor unit 21 and the indoor unit 31 may be connected to a central controller by wire or wirelessly, thereby enabled to operate under the control of the central controller.

The remote controller 41 may be connected to the indoor unit 31 to transmit a user's control command to the indoor unit 31 and to receive and display state information of the indoor unit 31. In this case, the remote controller 41 may communicate with the indoor unit 31 by wire or wirelessly depending on a connection type.

Meanwhile, the air conditioner 100 may further include at least one sensor (not shown) capable of detecting a state of indoor air. For example, the air conditioner 100 may further include a temperature sensor for sensing indoor temperature, a humidity sensor for sensing indoor humidity, an air pressure sensor for sensing indoor air pressure, a sensor for measuring an amount of dust in indoor air, and the like. In addition, the air conditioner 100 may include a sensor for collecting various types of data such as data on temperature, humidity, atmospheric pressure, an amount of dust in the air, or the like.

Meanwhile, the air conditioner 100 may communicate with the external device 10 and may transmit and receive data to and from each other. For example, the outdoor unit 21 may receive, from the external device 10 which measures a power quantity consumed by the air conditioner 100, data on the power quantity in real time.

Figure 2:
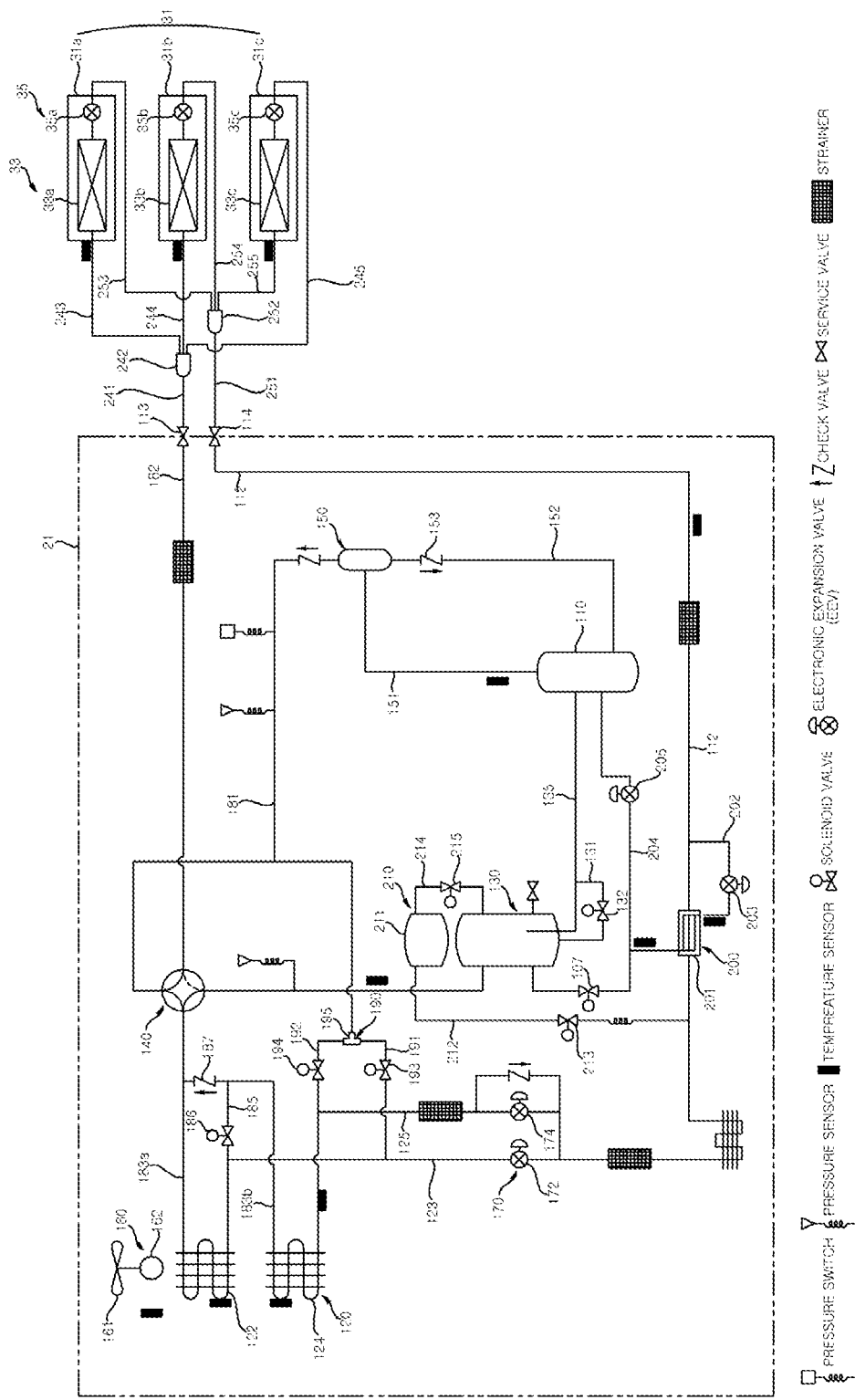
FIG. 2 is a schematic diagram of an outdoor unit and an indoor unit of FIG. 1.

FIG. 2 is a schematic diagram of an outdoor unit and an indoor unit of FIG. 1.

Referring to FIG. 2, an air conditioner 100 according to an embodiment of the present disclosure may be divided into an outdoor unit 21 and an indoor unit 31. The air conditioner 100 may include a plurality of indoor units 31*a* to 31*c*.

The outdoor unit 21 may include a compressor 110 configured to compress refrigerant, a compressor motor (not shown) configured to drive the compressor 110, an outdoor heat exchanger 120 configured to emit a compressed refrigerant, an accumulator 130 configured to temporarily store a vaporized refrigerant, remove moisture and foreign substances from the vaporized refrigerant, and then supply refrigerant at a constant pressure to the compressor, a cooling and heating switching valve 140 configured to change a flow path of the compressed refrigerant, an oil separator 150, an outdoor blower 160 including an outdoor fan 161 disposed on one side of the outdoor heat exchanger 120 to facilitate heat dissipation of refrigerant and an outdoor fan motor 162 for rotating the outdoor fan 161, at least one expansion mechanism (e.g., electronic expansion valves (EEV)) for expanding a condensed refrigerant, and the like.

More specifically, the outdoor unit 21 may include a gas pipe service valve 113 connected to a gas pipe 182 and a liquid pipe service valve 114 connected to the liquid pipe 112. The gas pipe service valve 113 and the liquid pipe service valve 114 may be connected to the indoor unit 31 and may circulate refrigerant of the outdoor unit 21.

At least one of an inverter compressor and a fixed-speed compressor may be used as the compressor 110. High-temperature, high-pressure refrigerant discharged from the compressor 110 may flow to the oil separator 150 through a discharge-side pipe 151 of the compressor 110.

The outdoor unit 21 may include a first oil collecting pipe 131 connecting a lower side of the accumulator 130 and a suction-side pipe 135 of the compressor 110. An oil return valve 132 for regulating a flow of oil may be disposed in the first oil collecting pipe 131.

The outdoor unit 21 may include a second oil collecting pipe 152 through which oil flows from the oil separator 150 to the compressor 110. A check valve 153 for restricting oil to flow to one side may be disposed in the second oil collecting pipe 152.

Refrigerant discharged from the oil separator 150 may flow to the cooling and heating switching valve 140 through a refrigerant discharge pipe 181.

The outdoor heat exchanger 120 may perform heat exchange between outdoor air and refrigerant and may be provided as a plurality of outdoor heat exchangers 122 and 124 according to an embodiment. The outdoor heat exchanger 120 may operate as a condenser during a cooling operation and as an evaporator during a heating operation.

A variable path valve 186 may be interposed between a first outdoor heat exchanger 122 and a variable path pipe 185. When the variable path valve 186 is opened, refrigerant flowing in the first outdoor heat exchanger 122 passes through the variable path valve 186, the variable path pipe 185, and the check valve 187 to the cooling and heating switching valve 140. When the variable path valve 186 is closed, refrigerant flowing in the first outdoor heat exchanger 122 during a cooling operation may flow to a first heat exchanger-expansion valve connecting pipe 123 and refrigerant flowing through the first heat exchanger-expansion valve connecting pipe 123 may flow to the first outdoor heat exchanger 122.

The outdoor expansion valve 170 may expand refrigerant flowing into the outdoor heat exchanger 120 during a heating operation, and may allow refrigerant to pass therethrough, without expanding the refrigerant, during a cooling operation. As the outdoor expansion valve 170, an electronic expansion valve (EEV) capable of regulating an opening value in accordance with an input signal may be used.

The outdoor expansion valve 170 may include a first outdoor expansion valve 172 for expanding refrigerant flowing to the first outdoor heat exchanger 122 and a second outdoor expansion valve 172 for expanding refrigerant flowing into the second outdoor heat exchanger 124.

The first outdoor heat exchanger 122 may be connected to the cooling and heating switching valve 140 through a heat exchanger-switching valve connecting pipe 183a. The first outdoor heat exchanger 122 may be connected to the outdoor expansion valve 170 through the first heat exchanger-expansion valve connecting pipe 123.

The second outdoor heat exchanger 124 may be connected to the second outdoor expansion valve 174 through a second heat exchanger-expansion valve connecting pipe 125.

The first outdoor expansion valve 172 may be interposed between the first heat exchanger-expansion valve connecting pipe 123 and a supercooling liquid pipe 112'. The second outdoor expansion valve 174 may be interposed between the second heat exchanger-expansion valve connecting pipe 125 and the supercooling liquid pipe 112'.

The outdoor unit 21 may further include a hot gas unit 190 for bypassing refrigerant, which is to be supplied to the outdoor heat exchanger 120, to the indoor unit 31 during a heating operation. The hot gas unit 90 may include hot gas bypass pipes 191 and 192 for bypassing refrigerant, and hot gas valves 193 and 194. In this case, a first hot gas valve 193 and a second hot gas valve 194 may be selectively operated. For example, only the first hot gas valve 193 may be opened or closed, or only the second hot gas valve 194 may be opened or closed. Meanwhile, in this embodiment, a combination valve 195 for combining the first hot gas bypass pipe 191 and the second hot gas bypass pipe 192 may be disposed.

The outdoor unit 21 may further include a supercooling unit 200 disposed in the liquid pipe 112. The supercooling unit 200 may include a supercooling heat exchanger 201, a supercooling bypass pipe 202 bypassed in the liquid pipe 112 and connected to the supercooling heat exchanger 201, a first supercooling expansion valve 203 disposed in the supercooling bypass pipe 202 and selectively expanding refrigerant flowing therein, a supercooling-compressor connecting pipe 204 connecting the supercooling heat exchanger 201 and the compressor 110, a second supercooling expansion valve 205 disposed in the supercooling-compressor connecting pipe 204 and selectively expanding refrigerant flowing therein, an accumulator bypass pipe 206 connecting the accumulator 130 and the supercooling-compressor connecting pipe 204 and/or a supercooling bypass valve 107 for controlling refrigerant flowing in the accumulator bypass pipe 206.

The outdoor unit 21 may further include a receiver 210 disposed in the liquid pipe 112. The receiver 210 may store liquid refrigerant in order to control an amount of circulating refrigerant. The receiver 210 may store the liquid refrigerant separately from liquid refrigerant being stored in the accumulator 30. For example, when the amount of the circulating refrigerant is insufficient, the receiver 210 may supply refrigerant to the accumulator 130, and when the amount of the circulating refrigerant is large, the receiver 210 may collect and store the refrigerant.

The receiver 210 may include a receiver tank 211 for storing refrigerant, and receiver valves 213 and 215 for regulating a flow of refrigerant.

A first receiver connecting pipe 112 may connect the receiver tank 211 and the supercooling liquid pipe 112' to each other. A first receiver valve 213 for regulating a flow of refrigerant may be disposed in the first receiver connecting pipe 112.

A second receiver connecting pipe 114 may connect the receiver tank 211 and the accumulator 130 to each other. A second receiver valve 215 for regulating a flow of refrigerant may be disposed in the second receiver connecting pipe 114.

The indoor units 31a to 31c may include indoor heat exchangers 33a to 33c each disposed indoors to perform a cooling or heating function, indoor expansion valves 35a to 35c each for expanding refrigerant to be supplied, indoor blowers (not shown) each including an indoor fan (not shown) disposed on one side of each of the indoor heat exchangers (33a to 33c) to facilitate heat dissipation of refrigerant and an indoor fan motor (not shown) for rotating the indoor fan, a plurality of sensors (not shown), and the like. At least one of the indoor heat exchangers 33a to 33c may be installed in each of the indoor units 31a to 31c.

The air conditioner 100 may include a gas pipe connecting pipe 241 connecting the gas pipe service valve 113 and a first distributor 242, and a liquid pipe connecting pipe 251 connecting the liquid pipe service valve 114 and a second distributor 252.

The first distributor 245 may be connected to the indoor heat exchangers 33a to 33c through first to third gas branch pipes 243, 244 and 245. The second distributor 252 may be connected to the indoor heat exchangers 33a to 33c through the first to third liquid branch pipes 253, 254 and 255.

The air conditioner 100 may be configured as an air cooler to cool an indoor space or may be configured as a heat pump to cool or heat the indoor space.

Figure 3:
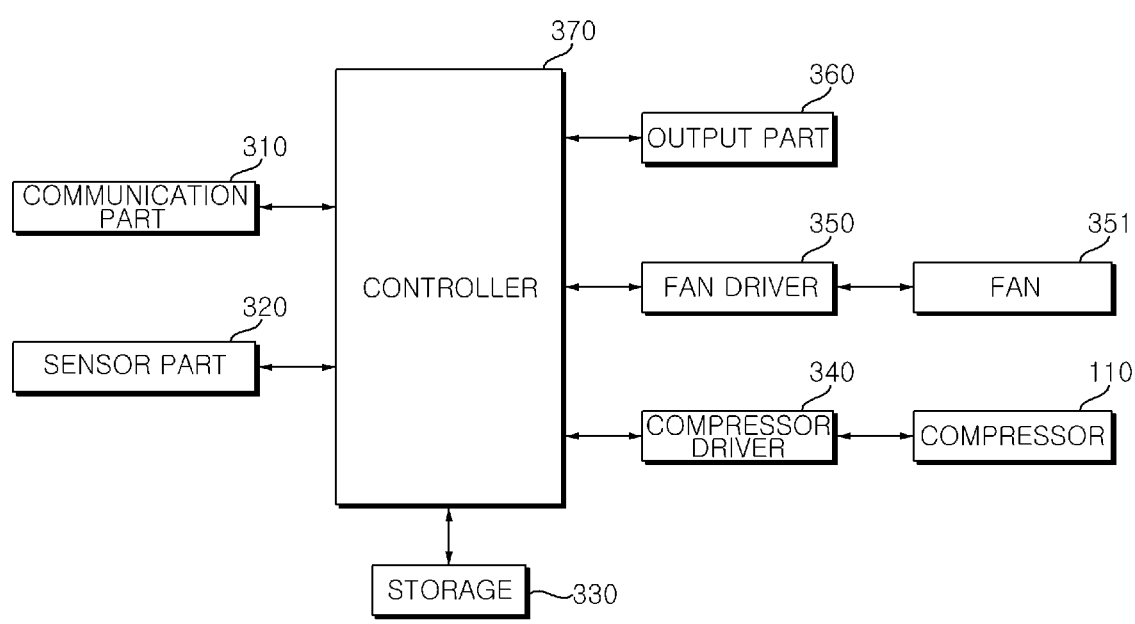
FIG. 3 is a block diagram of an air conditioner according to an embodiment of the present disclosure.

FIG. 3 is a block diagram of an air conditioner according to an embodiment of the present disclosure.

Referring to FIG. 3, an air conditioner 100 may include a sensor part 310, a communication part 320, a fan driver 330, a compressor driver 340, a storage 350, an output part 360 and/or a controller 370. The air conditioner 100 according to various embodiments of the present disclosure may further include various components not shown in FIG. 3.

The communication part 310 may include at least one communication module. The communication part 310 may be provided in each of an outdoor unit 21 and an indoor unit 31, and the outdoor unit 21 and the indoor unit 31 may transmit and receive data to and from each other. For example, a method for communication between the outdoor unit 21 and the indoor unit 31 may be wireless communication such as a Wi-Fi, Bluetooth, Beacon, and zigbee as well as communication using a power line, serial communication (e.g., RS-485 communication) and wired communication through a refrigerant pipe.

Meanwhile, the communication part 310 may transmit and receive data to and from an external device. For example, the communication part 310 may establish a wireless communication channel with an external device (e.g., a mobile terminal), and may transmit and receive data on a state of each component provided in the air conditioner 100 and on whether or not an error has occurred through the established wireless communication channel. The communication part 310 may connect to a server, which is connected to an external network, to transmit and receive data.

The sensor part 320 may include a plurality of sensors and may transmit data on detection values detected by the plurality of sensors to the controller 370. For example, the sensor part 320 may include a heat exchanger temperature sensor (not shown) for detecting temperature of the outdoor heat exchanger 120 and/or the indoor heat exchanger 33, a pressure sensor (not shown) for detecting pressure of refrigerant flowing through each pipe of the air conditioner 100, a pipe temperature sensor (not shown) for detecting temperature of refrigerant flowing through each pipe of the air conditioner 100, an indoor temperature sensor (not shown) for detecting indoor temperature, and the like.

The storage 330 may store a program for processing and controlling each signal in the controller 370 or may store a signal-processed voice or a data signal. For example, the storage 330 may store application programs designed to perform various tasks that can be processed by the controller 370, and may selectively select some of the stored application programs upon a request from the controller 370. The programs stored in the storage 330 are not particularly limited as long as they can be executed by the controller 370.

Although the embodiment in which the storage 330 of FIG. 3 is provided separately from the controller 370 is illustrated, the scope of the present disclosure is not limited thereto, and the storage 330 may be included in the controller 370.

The storage 330 may store data related to each component provided in the air conditioner 100. For example, the storage 330 may store data on detection values detected by a plurality of sensors provided in the sensor part 320. For example, the storage 330 may store data on an operating frequency of the compressor 110, pressure of refrigerant flowing into the compressor 110 (hereinafter, referred to as "compressor low pressure"), pressure of refrigerant discharged from the compressor 110 (hereinafter, referred to as "compressor high pressure"), and the like. For example, the storage 330 may store data on the rotational speed of the fan 351, an opening degree of each electronic expansion valves (EEV), a degree of superheating of each EVV, a degree of subcooling of each EVV, and the like. For example, the storage 330 may store at least one database on a power quantity consumed by the air conditioner 100 and the like.

The compressor driver 340 may drive the compressor 110. For example, the compressor driver 340 may include a rectifier (not shown) for rectifying AC power into DC power and outputting the DC power, a dc terminal capacitor for storing a pulsating voltage from the rectifier, an inverter (not shown) provided with a plurality of switching elements to convert smoothed DC power to three-phase AC power of a predetermined frequency and output the three-phase AC power and/or a compressor motor (not shown) for driving the compressor 110 based on the three-phase AC power output from the inverter.

The compressor driver 340 may change the operating frequency of the compressor 110 under the control of the controller 370. For example, under the control of the controller 370, the compressor driver 340 may change the operating frequency of the compressor 110 by changing a frequency of the three-phase AC power output to the compressor motor.

The fan driver 350 may drive the fan 351 provided in the air conditioner 100. For example, the fan driver 350 may drive the outdoor fan 161 and/or an indoor fan (not shown). For example, the fan driver 350 may include a rectifier (not shown) for rectifying AC power into DC power and outputting the rectified DC power, a dc terminal capacitor for storing a pulsating voltage from the rectifier, an inverter (not shown) provided with a plurality of switching elements to convert the rectified DC power into three-phase AC power of a predetermined frequency and output the three-phase AD power and/or a motor for driving a fan based on the three-phase AC power output from the inverter.

Meanwhile, the fan driver 350 may be provided with a configuration for driving the outdoor fan 161 and the indoor fan separately.

The fan driver 350 may change a rotational speed of the fan 351 under the control of the controller 370. For example, under the control of the controller 370, the fan driver 350 may change the rotational speed of the outdoor fan 161 by changing a frequency of the three-phase AC power output to the outdoor fan motor. For example, under the control of the controller 370, the fan driver 350 may change the rotational speed of the indoor fan by changing a frequency of the three-phase AC power output to the indoor fan motor.

The output part 360 may include a display device such as a display (not shown) and a light emitting diode (LED), and may display an operation state of the air conditioner 100, occurrence of an error, through the display device, and the like.

The output part 360 may include an audio device such as a speaker and a buzzer, and may output a sound effect corresponding to an operating state of the air conditioner 100 through an audio device and output a predetermined warning sound in the event of an error.

The controller 370 may be connected to each component provided in the air conditioner 100 and may control the overall operation of each component. The controller 370 may transmit and receive data to and from each component provided in the air conditioner 100. The controller 370 may be provided in at least one of the indoor unit 31 and/or a central controller as well as the outdoor unit 21. For example, the outdoor unit 21, the indoor unit 31, and the central controller may each include a controller 370 for controlling operations.

The controller 370 may include at least one processor. Here, the processor may be a general processor such as a central processing unit (CPU). Of course, the processor may be a dedicated device such as an ASIC or other hardware-based processor.

The controller 370 may generate a learning model by learning data related to each component provided in the air conditioner 100 through machine learning such as deep learning. The controller 370 may control each component included in the air conditioner 100 by using data related to each component included in the air conditioner 100 and a pre-learned learning model. Hereinafter, with reference to FIG. 4, deep learning will be described in detail.

Figure 4:
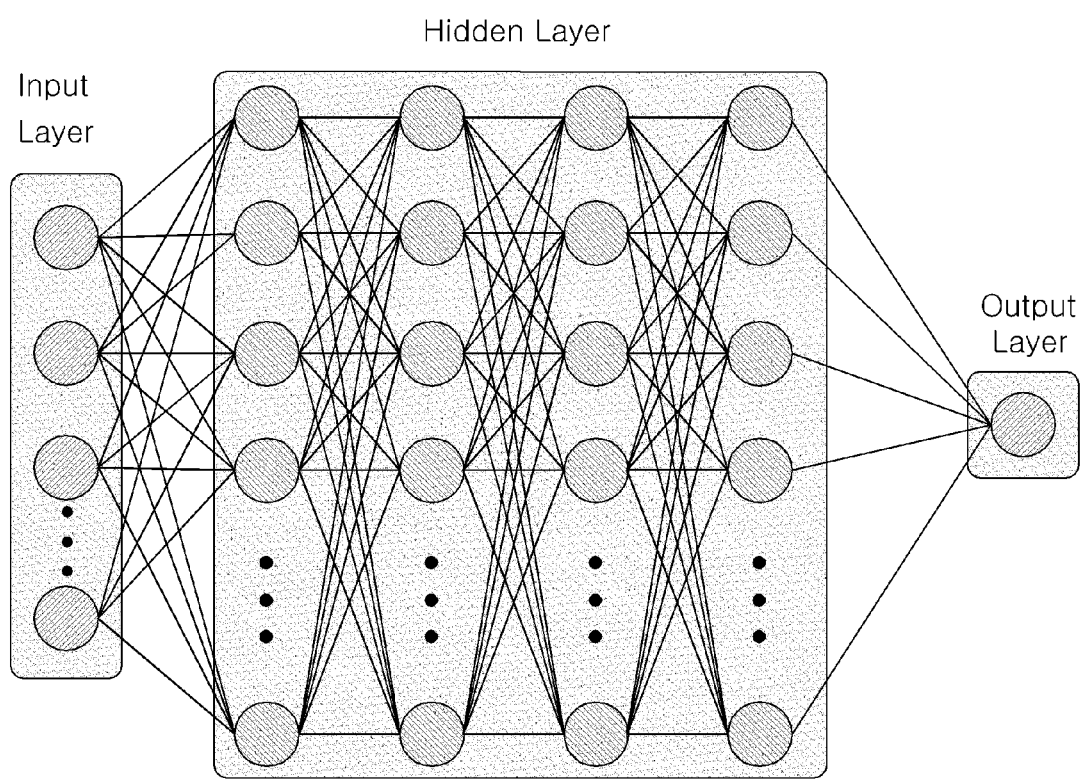
FIG. 4 is a diagram referred to in explaining deep learning, according to an embodiment of the present disclosure.

FIG. 4 is a diagram referred to in explaining deep learning, according to an embodiment of the present disclosure.

Machine learning refers to a technology in which a computer learns from data without a human's instructing the computer directly to logic, so that the computer can solve a problem.

Deep learning is a method of teaching a computer a human way of thinking based on artificial neural networks (ANN) and the like, that is, an artificial intelligence technology which allows computers to learn on their own like humans. The ANN may be implemented in the form of software or in the form of hardware such as a chip. For example, the ANN may include various types of algorithms such as a deep neural network (DNN), a convolutional neural network (CNN), a recurrent neural network (RNN), a deep belief network (DBN), etc.

Referring to FIG. 4, the ANN may include an input layer, a hidden layer, and an output layer. Each layer may include a plurality of nodes, each layer may be connected to a next layer, and nodes between neighboring layers may be connected to each other with a weight.

A computer may discover a certain pattern from data to form a feature map and extract a low-level feature, a middle-level feature, and a high-level feature to recognize an object and output a result.

In addition, each node may operate based on an activation model, and an output value corresponding to an input value may be determined by an activation model.

An output value of an arbitrary node, for example, a node of low-level feature, may be input to a next layer connected to the corresponding node, for example, a node of intermediate-level feature. A node of a next layer, for example, a node of intermediate-level feature may receive values output from a plurality of nodes of lower-level feature.

In this case, an input value of each node may be a value in which a weight is applied to an output value of the node of the previous layer. A weight may refer to a connection strength between nodes. In addition, a deep learning process may be regarded as a process of finding out appropriate weights and biases.

Meanwhile, an output value of an arbitrary node, for example, an intermediate-level feature, may be input to a next layer connected to the corresponding node, for example, a node of higher-level feature. A node of a next layer, for example, a node of a higher-level feature, may receive values output from a plurality of nodes of intermediate-level feature.

An ANN may extract feature information corresponding to each level by using a learned layer corresponding to a corresponding level. The ANN may recognize a predetermined object by sequentially abstracting and utilizing feature information of a highest level.

Meanwhile, learning of the ANN may be accomplished by adjusting the weight of the connection line between nodes so that a desired output is obtained with respect to input data, and a bias value may also be adjusted, if necessary. In addition, the ANN may continuously update a weight value by learning. In addition, a method such as back-propagation and the like may be used for learning of the ANN.

The storage 330 may store data obtained from each component provided in the air conditioner 100, data for learning of the ANN, and the like. For example, the storage 330 may store a database including data for each component provided in the air conditioner 100 for the purpose of learning of the ANN, weights and biases included in the structure of the ANN, and the like.

Meanwhile, the controller 370 may include a data acquirer (not shown), a model learning part (not shown), and/or a result calculator (not shown).

The data acquirer may acquire data on each component provided in the air conditioner 100 and determine input data that is a target to be learned among the acquired data.

The model learning part may generate a learning model by learning the input data. The model learning part may update a pre-generated learning model based on data on each component provided in the air conditioner 100.

The result calculator may calculate result data corresponding to input data by using the input data and the pre-learned learning model from among the data on each component provided in the air conditioner 100.

Figure 5:
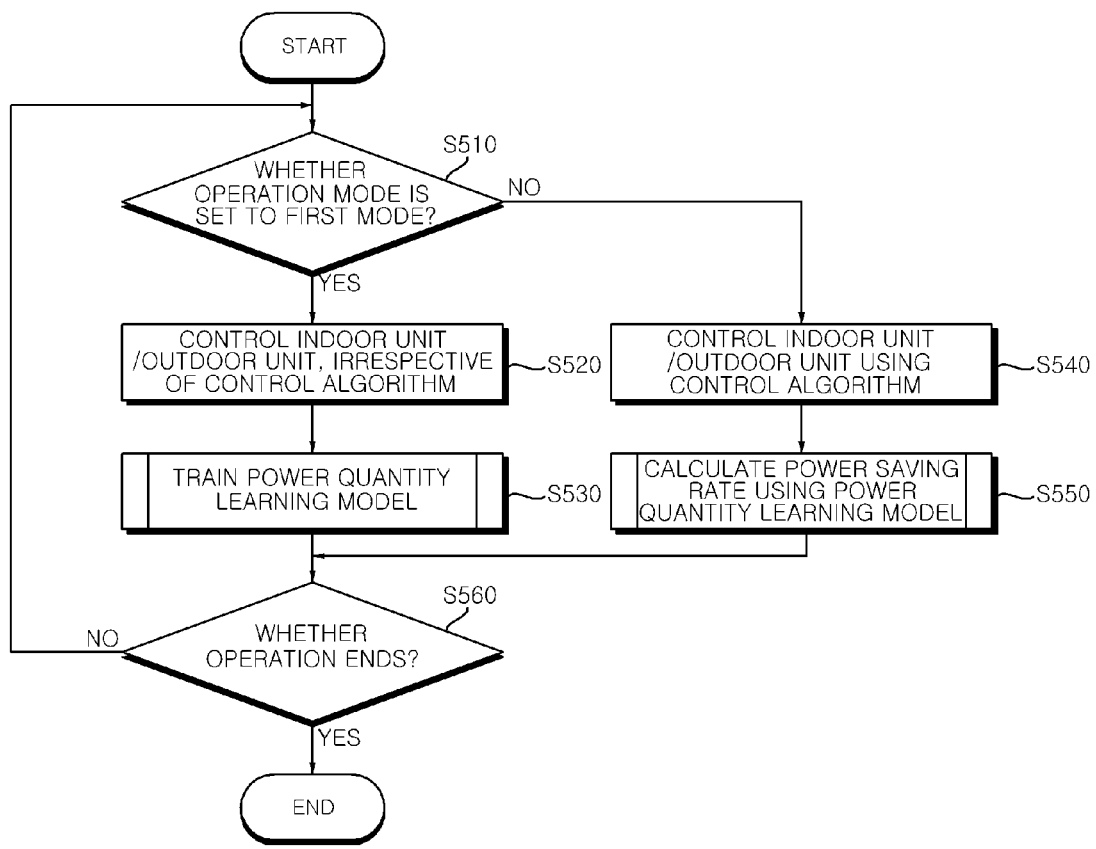
FIG. 5 to FIG. 7 are flowcharts illustrating an operation method of an air conditioner according to an embodiment of the present disclosure.
Figure 6:
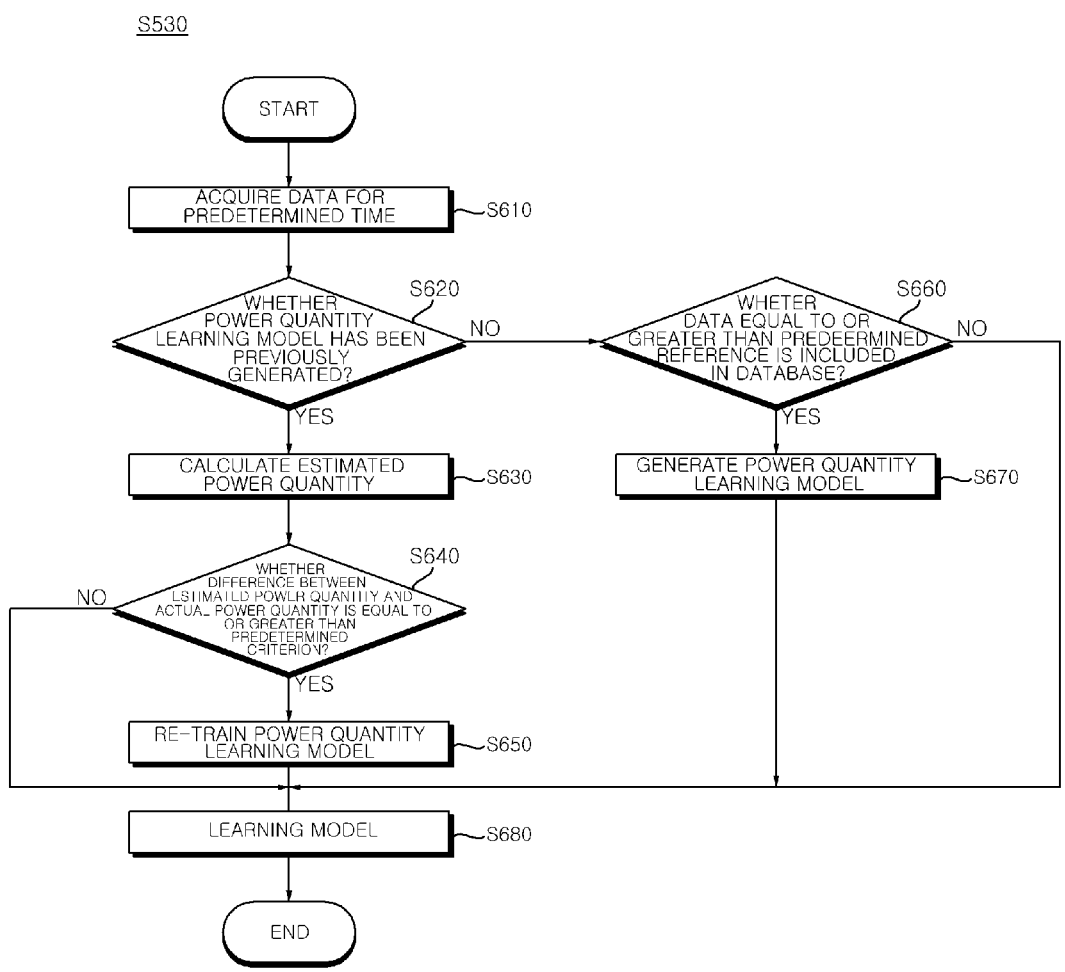
Figure 7:
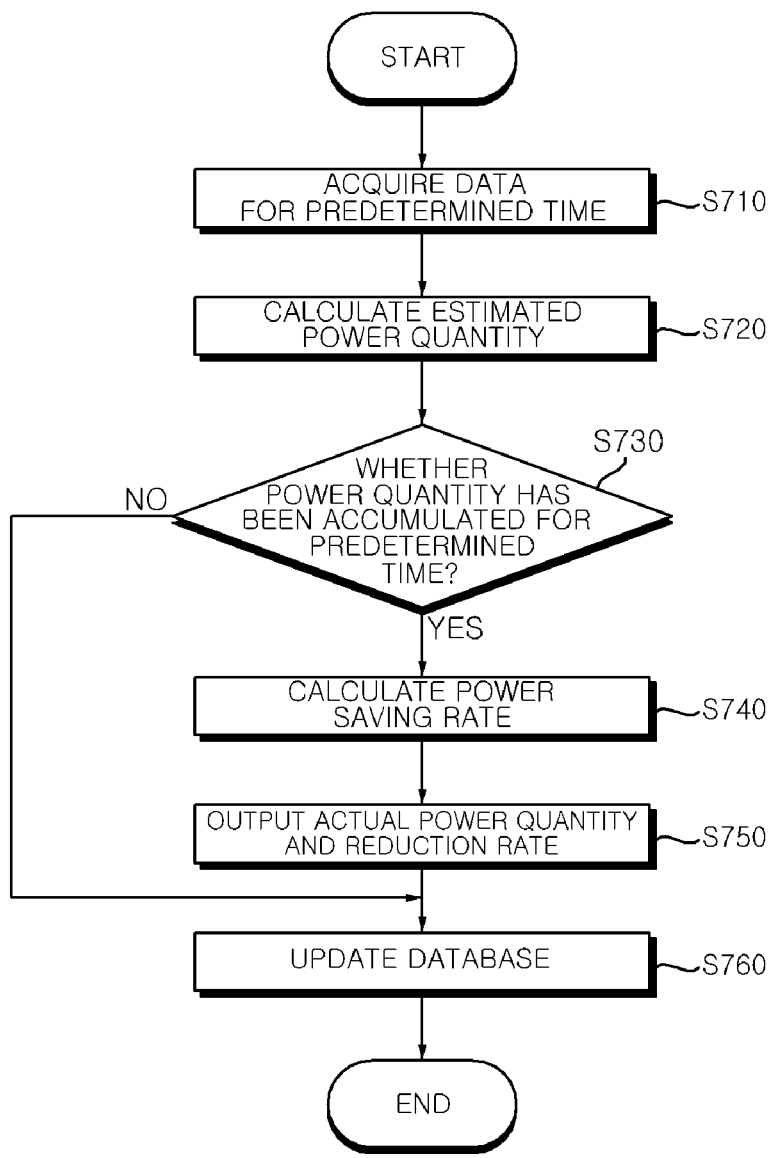

FIGS. 5 to FIG. 7 are flowcharts illustrating an operation method of an air conditioner according to an embodiment of the present disclosure, and FIGS. 8 to 12 are diagrams referred to in explaining an operation of an air conditioner.

Referring to FIG. 5, in S510, an air conditioner 100 may determine whether an operation mode is set to a first mode. Here, the first mode may refer to a mode for controlling at least one of components included in the air conditioner 100, irrespective of a learning model (hereinafter, a control algorithm) previously learned to control the components included in the air conditioner 100. In one embodiment, the first mode may be referred to as a normal operation mode.

In S520, when the operation mode is set to the first mode, the air conditioner 100 may control either or both of an outdoor unit 21 and an indoor unit 31, irrespective of a control algorithm. For example, the air conditioner 100 may control an operating frequency of a compressor 110 according to a difference between a target temperature set by a user and an indoor temperature detected by an indoor temperature sensor. In this case, the air conditioner 100 may decrease the operating frequency of the compressor 110 as the difference between the target temperature and the indoor temperature decreases.

In S530, the air conditioner 100 may train a learning model (hereinafter, referred to as a power quantity learning model) related to an actual power quantity consumed by the air conditioner 100 based on data on each component in the air conditioner 100 acquired while the operation mode is set to the first mode. Here, the data on each component acquired by the air conditioner 100 while the operation mode is set to the first mode may be referred to as first data. Here, the power quantity learning mode may be a learning model in which the first data is set as a factor of an input layer and a power quantity used by the air conditioner is set as a factor of an output layer to learn a correlation between the first data and the power quantity using an artificial neural network (ANN). In this regard, it will be described in more detail with reference to FIG. 6.

Referring to FIG. 6, the air conditioner 100 may acquire the first data for a predetermined time in S610. For example, the air conditioner 100 may acquire an operating frequency of the compressor 110, a compressor low pressure, a compressor high pressure, a temperature of an outdoor heat exchanger 120, a temperature of an indoor heat exchanger 33, an outdoor temperature, an indoor temperature, a rotational speed of an outdoor fan 161, a rotational speed of an indoor fan, a ratio of the number of indoor units in operation to the total number of indoor units 31 provided in the air conditioner 100 (hereinafter, referred to as an operation rate), and the like as the first data.

In S620, the air conditioner 100 may determine whether the power quantity learning model has been previously generated. For example, when generating a power quantity learning model, the air conditioner 100 may store the generated power quantity learning model in storage 330. In this case, the air conditioner 100 may determine whether the power quantity learning model has been previously generated, by checking whether the power quantity learning model is stored in the storage 330.

In S630, when the power quantity learning model has been previously generated, the air conditioner 100 may calculate a power quantity to be consumed by the air conditioner 100 for a predetermined time, based on the first data acquired for the predetermined time and the generated power quantity learning model. Here, the power quantity calculated using the power quantity learning model may be referred to as an estimated power quantity. Also, the estimated power quantity calculated based on the first data acquired by the air conditioner 100 while the operation mode is set to the first mode may be referred to as the first estimated power quantity. For example, the air conditioner 100 may calculate an estimated power quantity based on an outdoor temperature, an indoor temperature, a temperature of the outdoor heat exchanger 120, an operation rate, and a rotation speed of the indoor fan out of first data acquired for 10 minutes.

Meanwhile, the air conditioner 100 may monitor an actual power quantity consumed by the air conditioner 100 for a predetermined time. For example, the air conditioner 100 may check the actual power quantity consumed by the air conditioner 100 based on data received from an external device 10 that measures the power quantity consumed by the air conditioner 100. For example, the air conditioner 100 may check the actual power quantity consumed by the air conditioner 100 based on an operating frequency of the compressor 110. In this case, as the operating frequency of the compressor 110 increases, the actual power quantity consumed by the air conditioner 100 may also increase.

In S640, the air conditioner 100 may determine whether a difference between the estimated power quantity calculated and the actual power quantity consumed by the air conditioner 100 is equal to or greater than a present reference amount. For example, when the difference between the estimated power quantity calculated and the actual power quantity consumed by the air conditioner 100 is 1% or more of the actual power quantity, the air conditioner 100 may determine that the difference is equal to or greater than the present reference amount.

In S650, when the difference between the estimated power quantity calculated and the actual power quantity consumed by the air conditioner 100 is equal to or greater than the present reference amount, the air conditioner 100 may re-train the power quantity learning model based on the first data acquired for the predetermined time.

Meanwhile, in S660, when the power quantity learning model has not been previously generated, that is, when the power quantity learning model is not stored in the storage 330, the air conditioner may check whether data equal to or greater than the predetermined criterion is included in a database stored in the storage 330. For example, when data corresponding to a period of one week or more, which is a preset minimum period, is accumulated in the database, the air conditioner 100 may determine that the data equal to or greater than the predetermined criterion is included in the database.

In S670, when the data equal to greater than or equal to the predetermined criterion is included in the database, the air conditioner 100 may generate a power quantity learning model based on the data included in the database. For example, the air conditioner 100 may calculate a power quantity consumed by the air conditioner 100 for a predetermined time, based on an outdoor temperature, an indoor temperature, a temperature of the outdoor heat exchanger 120, an operation rate, and a rotation speed of the indoor fan out of the data included in the database.

In S680, the air conditioner 100 may update the database of the storage 330. The first data acquired for the predetermined time and the actual power quantity consumed by the air conditioner 100 for the predetermined time may be added to the database in consideration of date and time. In this case, the air conditioner 100 may delete data added to the database before a preset period (for example, 2 years) from a current pint in time, from the data included in the database.

Meanwhile, the air conditioner 100 may further include a database (hereinafter, referred to as a power quantity database) including data in which the actual power quantity consumed by the air conditioner 100 and the estimated power quantity for the predetermined time are mapped. In this case, when the operation mode is set to the first mode, the air conditioner 100 may determine an estimated power quantity mapped to an actual power quantity as the same value as the actual power quantity. That is, while the operation mode is set to the first mode, data with an estimated power quantity and an actual power quantity having the same value may be added to the power quantity database.

Figure 8:
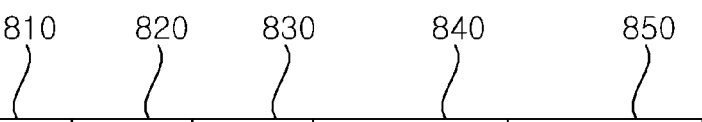
FIG. 8 to FIG. 12B are diagrams referred to in explaining an operation of an air conditioner.

Referring to FIG. 8, data may be added to the power quantity database according to time sequence. For example, the data included in the power quantity database may include dates and times 810, 820, and 830 at which the data were added, an actual power quantity 840 consumed by the air conditioner 100, and an estimated power quantity 850. In this case, in the case of data added to the power quantity database while the operation mode is set to the first mode, the actual power quantity 840 and the estimated power quantity 850 having the same value may be mapped to each other.

Referring back to FIG. 5, in S540, when the operation mode is set to a second mode rather than the first mode, the air conditioner 100 may control either or both of the outdoor unit 21 and the indoor unit 31 using a control algorithm. Here, the second mode may refer to a mode for controlling at least one of the components included in the air conditioner 100 using a control algorithm previously learned to control the components included in the air conditioner 100. In one embodiment, the second mode may be referred to as a smart operation mode. Meanwhile, an estimated power quantity calculated based on second data acquired by the air conditioner 100 while the operation mode is set to the second mode may be referred to as a second estimated power quantity.

A method of controlling the outdoor unit 21 and/or the indoor unit 31 by using the control algorithm will be described later with reference to FIGS. 13 to 21.

In S550, the air conditioner 100 may calculate a power saving rate regarding a power quantity saved for a predetermined time, based on the power quantity learning model and data on each component provided in the air conditioner 100 acquired while the operation mode is set to the second mode. Here, the data on each component acquired by the air conditioner 100 while the operation mode is set to the second mode may be referred to as the second data. In this regard, it will be described with reference to FIG.

Referring to FIG. 7, the air conditioner 100 may acquire second data for a predetermined time in S710. For example, the air conditioner 100 may acquire an operating frequency of the compressor 110, a compressor low pressure, a compressor high pressure, a temperature of an outdoor heat exchanger 120, a temperature of an indoor heat exchanger 33, an outdoor temperature, an indoor temperature, a rotational speed of an outdoor fan 161, a rotational speed of an indoor fan, an operation rate, and the like as the second data.

In S720, the air conditioner 100 may calculate an estimated power quantity based on the second data acquired for the predetermined time and the power quantity learning model. For example, the air conditioner 100 may calculate the estimated power quantity, based on an outdoor temperature, an indoor temperature, a temperature of the outdoor heat exchanger 120, an operation rate, and a rotation speed of the indoor fan out of second data acquired for 10 minutes.

The air conditioner 100 may correct the estimated power quantity based on data on the compressor 110. For example, the air conditioner 100 may monitor a compressor low pressure for refrigerant flowing into the compressor 110 while the operation mode is set to the second mode, and may determine minimum and maximum values of estimated power quantity corresponding to the compressor low pressure. In this case, when the estimated power quantity calculated based on the power quantity learning model is less than the minimum value, the air conditioner 100 may correct the estimated power quantity to the minimum value, and when the estimated power quantity calculated based on the power quantity learning model exceeds the maximum value, the air conditioner 100 may correct the estimated power quantity to the maximum value.

In S730, the air conditioner 100 may check whether or not data corresponding to a predetermined period or longer has been accumulated in the power quantity database. For example, when the predetermined period is set by a user to one day in order to check a power quantity saved for one day, the air conditioner 100 may check whether or not data corresponding to one or more days has been accumulated in the power quantity database.

In S740, when the data corresponding to the predetermined period or longer has been accumulated in the power quantity database, the air conditioner 100 may calculate a power saving rate saved for the predetermined period, based on the actual power quantity accumulated for the predetermined time and the estimated power quantity. For example, based on the estimated power quantity calculated in S720, the actual power quantity, and the data included in the power quantity database, the air conditioner 100 may calculate a difference between the estimated power quantity accumulated for the predetermined period and the actual power quantity consumed by the air conditioner for the predetermined period as a power saving rate. In this case, the air conditioner 100 may calculate a value obtained by dividing a saving amount of power consumption by the actual power quantity consumed by the air conditioner 100 for the predetermined period as the power saving rate.

In S750, the air conditioner 100 may output, through an output part 360, a screen including the actual power quantity consumed by the air conditioner 100, the estimated power quantity, and/or the power saving rate for the predetermined period. For example, the air conditioner 100 may display, through a display, a graph corresponding to the actual power quantity consumed by the air conditioner 100 for the predetermined period, a graph corresponding to the estimated power quantity accumulated for the predetermined period, and an indicator indicating a power saving rate.

Figure 9:
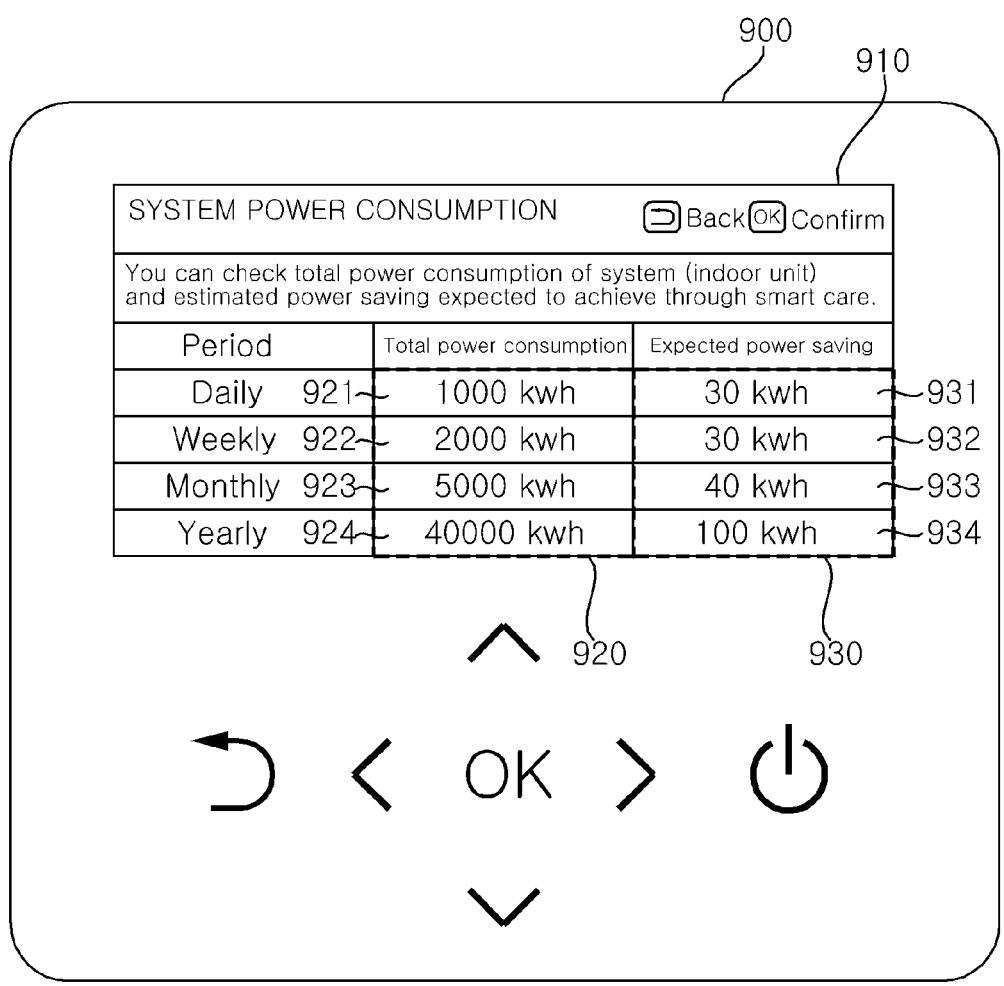

Referring to FIG. 9, the air conditioner 100 may output, through a display 910 included in a remote controller 900, actual power quantities 920 consumed by the air conditioner 100 for a plurality of periods, and power savings 930 corresponding thereto together.

The actual power quantities 920 consumed by the air conditioner 100 may include a daily power consumption 921, a weekly power consumption 922, a monthly power consumption 923, and an annual power consumption 924 of the air conditioner 100. The power savings 930 may include a daily power saving 931, a weekly power saving 932, a monthly power saving 933, and an annual power saving 934 of the air conditioner 100.

Meanwhile, in this embodiment, it is described that a screen is output through the display 910 of the remote controller 900, but the present disclosure is not limited thereto, and the screen may be output through a display provided in the outdoor unit 21, the indoor unit 31 or the like.

Referring back to FIG. 7, the air conditioner 100 may update the power quantity database in S760. The air conditioner 100 may add, to the power quantity database, data in which an actual power quantity consumed by the air conditioner 100 for a predetermined time in which the operation mode is set to the second mod and an estimated power quantity therefor are mapped to each other.

Referring back to FIG. 5, the air conditioner 100 may check whether an operation ends in S560. In this case, the air conditioner 100 may check an operation mode until an operation ends, and may perform an operation corresponding to a first mode or a second mode set as the operation mode.

Meanwhile, according to an embodiment of the present disclosure, the air conditioner 100 may output any of various user interface (UI) screens through the display 910 included in the remote controller 900 according to the operation mode. For example, when the operation mode is set to a general operation mode that is the first mode, the air conditioner 100 may output a screen related to an actual power quantity consumed by the air conditioner 100. For example, when the operation mode is set to a smart operation mode which is the second mode, the air conditioner 10 may output a screen related to an actual power quantity consumed by the air conditioner 100 and an estimated power quantity calculated based on a power quantity learning model.

Figure 10:
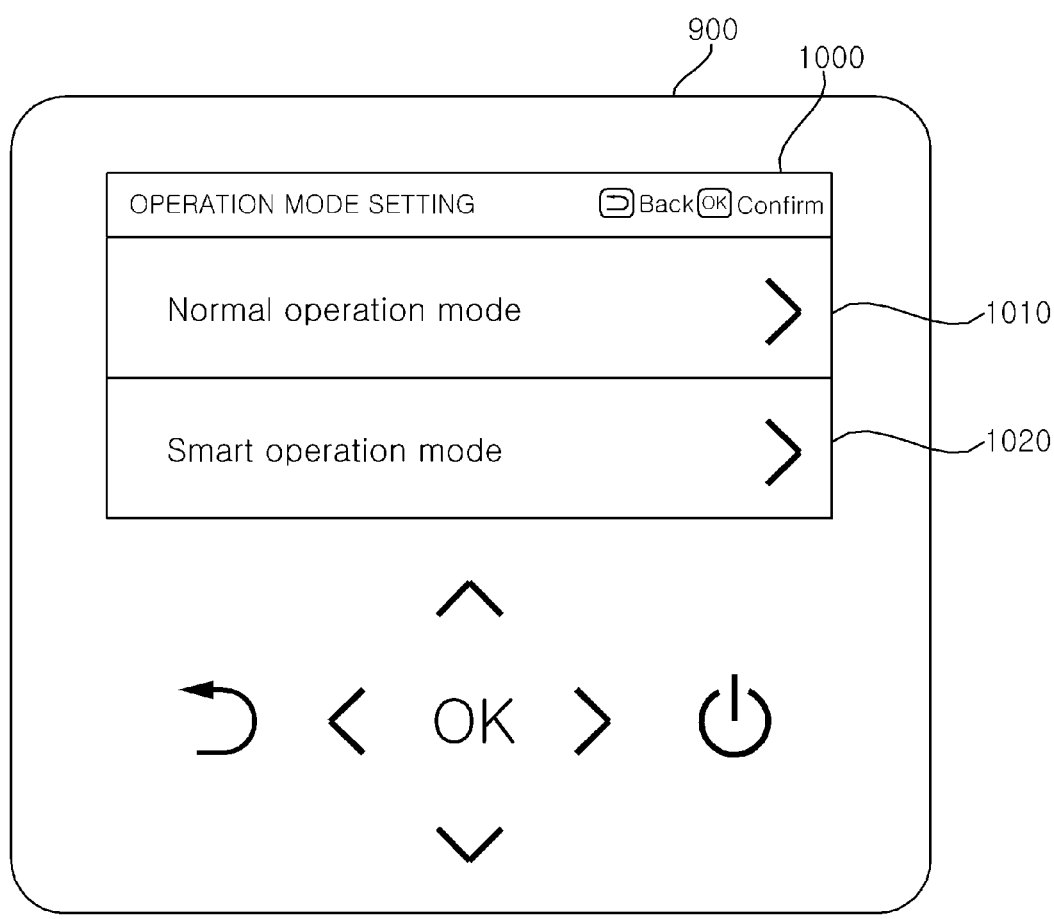

Referring to FIG. 10, the air conditioner 100 may output a UI screen 1000 for setting an operation mode through a display included in the remote controller 900. In this case, the air conditioner 100 may determine an operation mode according to a user's input to select one of a screen region 1010 corresponding to a normal operation mode and a screen region 1020 corresponding to a smart operation mode.

Figure 11A:
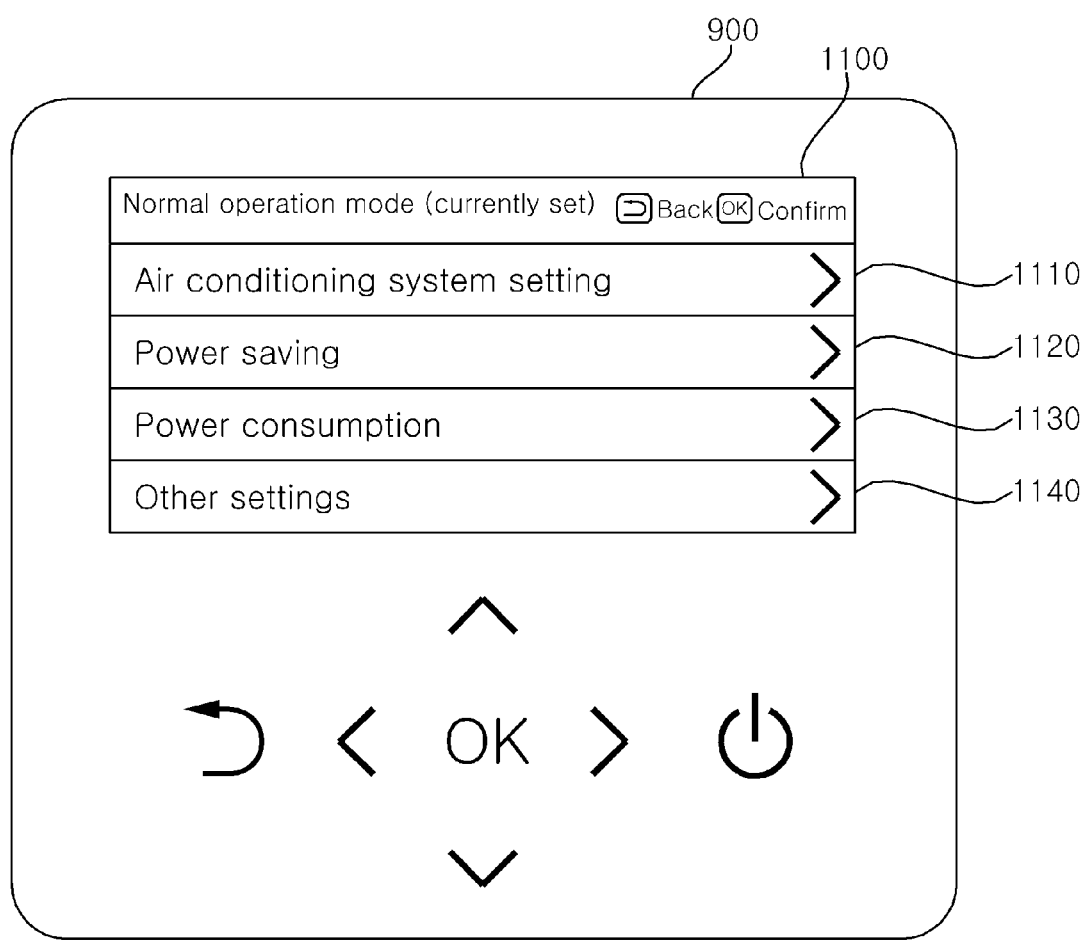

Referring to FIG. 11A, when the operation mode is determined to be the normal operation mode according to the user's input, the air conditioner 100 may output a UI screen 1100 corresponding to the normal operation mode.

The UI screen 1100 corresponding to the general operation mode may include a screen region 1110 corresponding to setting for air conditioning in the general operation mode, such as a set temperature, a screen region 1120 corresponding to setting for reducing a power quantity consumed by the air conditioner 100 in the normal operation mode, a screen region 1130 corresponding to monitoring of a power quantity consumed by the air conditioner 100 in the normal operation mode, and/or a screen region 1140 corresponding to other settings for the air conditioner 100.

Figure 11B:
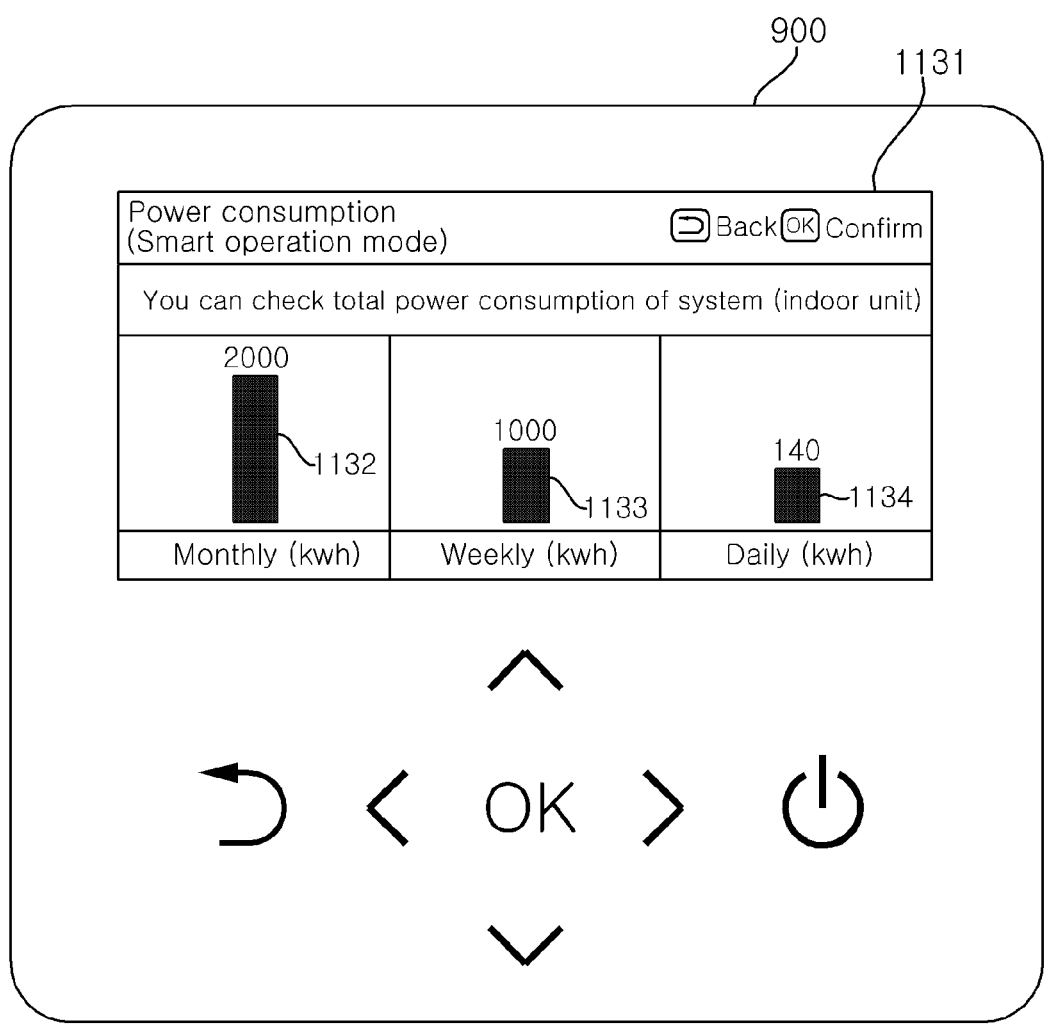

Referring to FIG. 11B, when the user selects the screen region 1130 corresponding to monitoring of a power quantity consumed by the air conditioner 100 in the general operation mode, the air conditioner 100 may output a UI screen 1131 (hereinafter, referred to as a first UI screen) for monitoring a power quantity consumed by the air conditioner 100 in the normal operation mode.

The first UI screen 1131 may include at least one indicator for an actual power quantity consumed by the air conditioner 100. For example, the first UI screen 1131 may include an indicator 1132 for an actual power quantity monthly consumed by the air conditioner 100 in the normal operation mode, an indicator 1133 for an actual power quantity weekly consumed by the air conditioner 100 in the normal operation mode, and/or an indicator 1134 for an actual power quantity daily consumed by the air conditioner 100 in the normal operation mode.

Figure 12A:
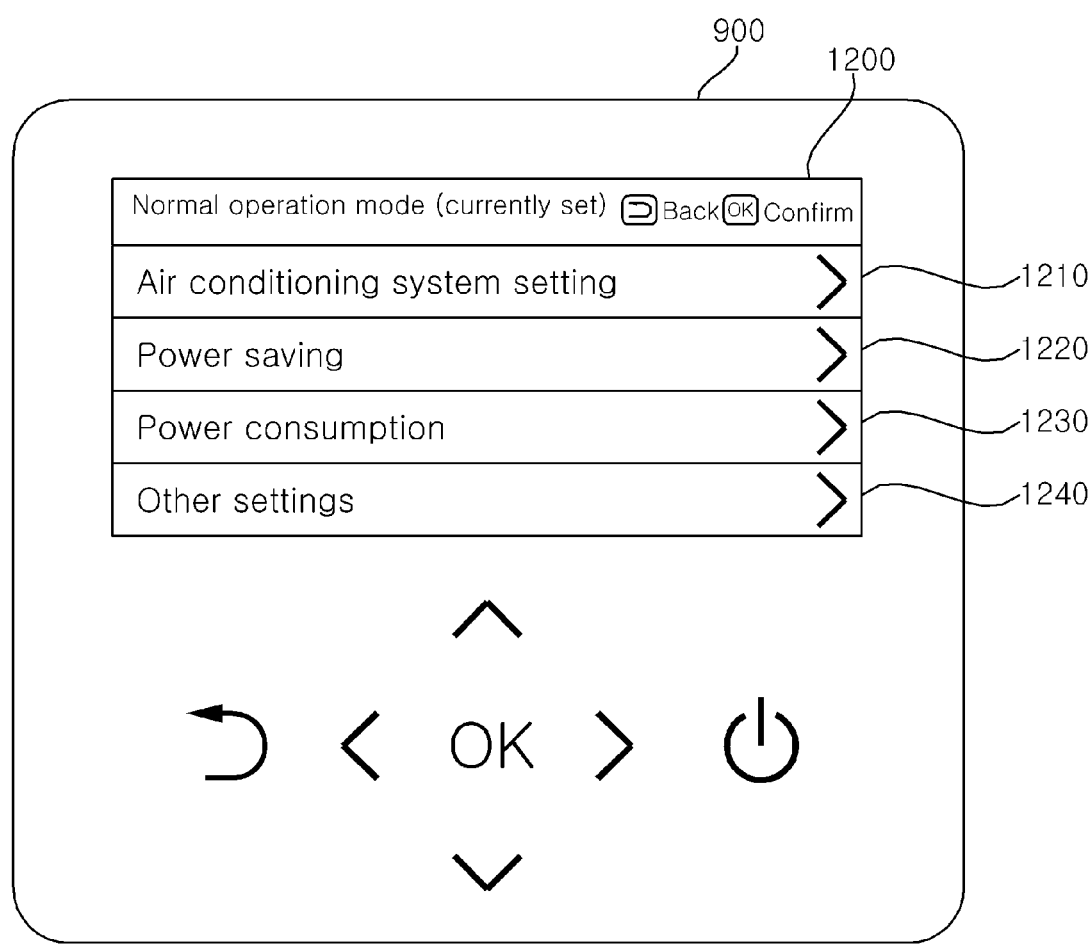

Meanwhile, referring to FIG. 12A, when the operation mode is determined to be a smart operation mode according to the user's input, the air conditioner 100 may output a UI screen 1200 corresponding to the smart operation mode.

The UI screen 1200 corresponding to the smart operation mode may include a screen region 1210 corresponding to setting for air conditioning in the smart operation mode, such as a set temperature, a screen region 1220 corresponding to setting for reducing a power quantity consumed by the air conditioner 100 in the smart operation mode, a screen region 1230 corresponding to monitoring of a power quantity consumed by the air conditioner 100 in the smart operation mode, and/or a screen region 1240 corresponding to other settings for the air conditioner 100.

Figure 12B:
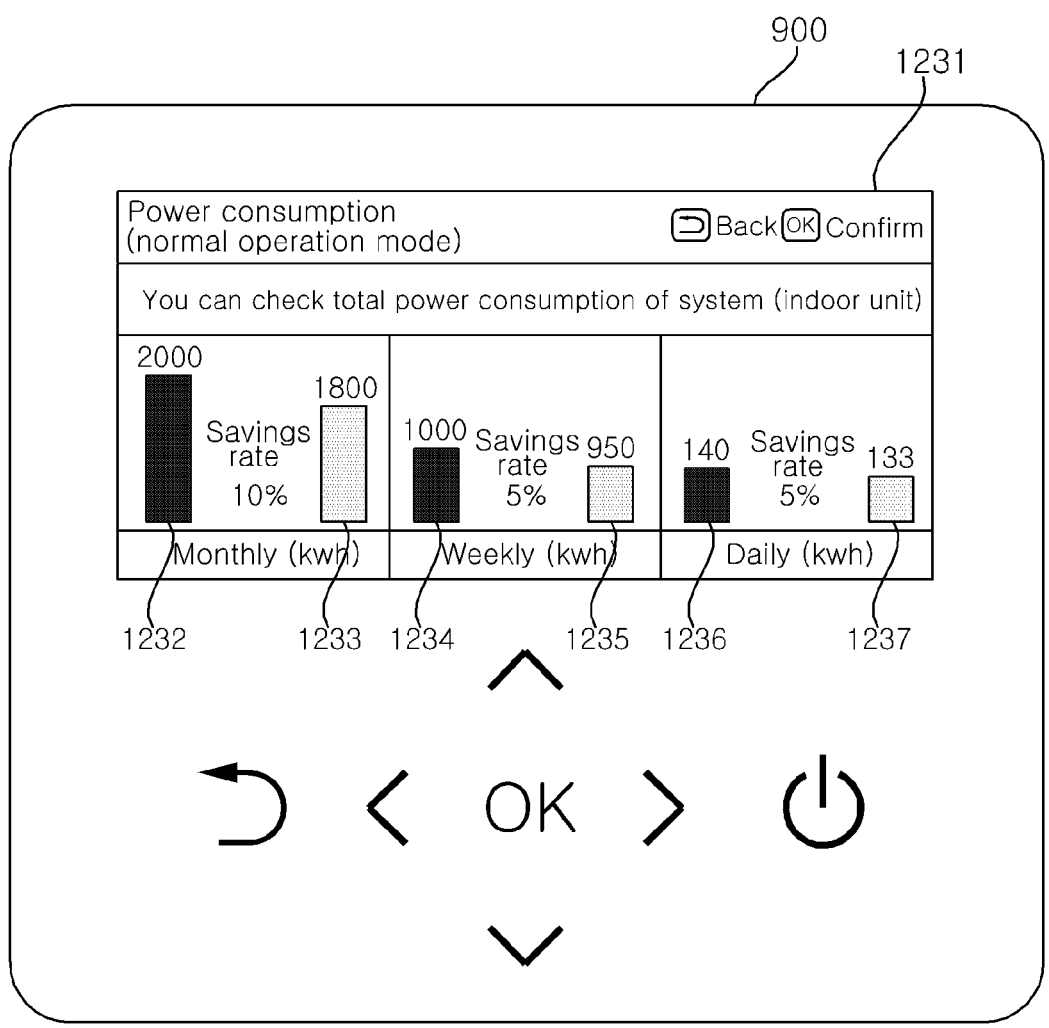

Referring to FIG. 12B, when the user selects the screen region 1230 corresponding to monitoring of a power quantity consumed by the air conditioner 100 in the smart operation mode, the air conditioner 100 may output a UI screen 1231 (hereinafter, referred to as a second UI screen) for monitoring a power quantity consumed by the conditioner 100 in the smart operation mode.

The second UI screen 1231 may include at least one indicator for an estimated power quantity expected to be consumed by the air conditioner 100 in the normal operation mode. For example, the second UI screen 1231 may include an indicator 1232 for a power quantity expected to be monthly consumed by the air conditioner 100 in the normal operation mode, an indicator 1234 for a power quantity expected to be weekly consumed by the air conditioner 100 in the normal operation mode, and an indicator 1236 for a power quantity expected to be daily consumed by the air conditioner 100 in the normal operation mode.

The second UI screen 1231 may include at least one indicator for an actual power quantity consumed by the air conditioner 100 in the smart operation mode. For example, the second UI screen 1231 may include an indicator 1233 for an actual power quantity monthly consumed by the air conditioner 100 in the smart operation mode, an indicator 1235 for an actual power quantity weekly consumed by the air conditioner 100 in the smart operation mode, and/or an indicator 1237 for an actual power quantity daily consumed by the air conditioner 100 in the smart operation mode.

The second UI screen 1231 may include an indicator for a power saving rate regarding a power quantity saved for a predetermined period during which the smart operation mode is set. For example, the second UI screen 1231 may include a power saving rate regarding a power quantity saved for one month during which the smart operation mode is set, a power saving rate regarding a power quantity saved for one week during which the smart operation mode is set, and/or a power saving rate regarding a power quantity saved for one day during which the smart operation mode is set.

FIG. 13 to FIG. 21 are diagrams referred to in explaining a control algorithm used to control components included in an air conditioner.

Figure 13:
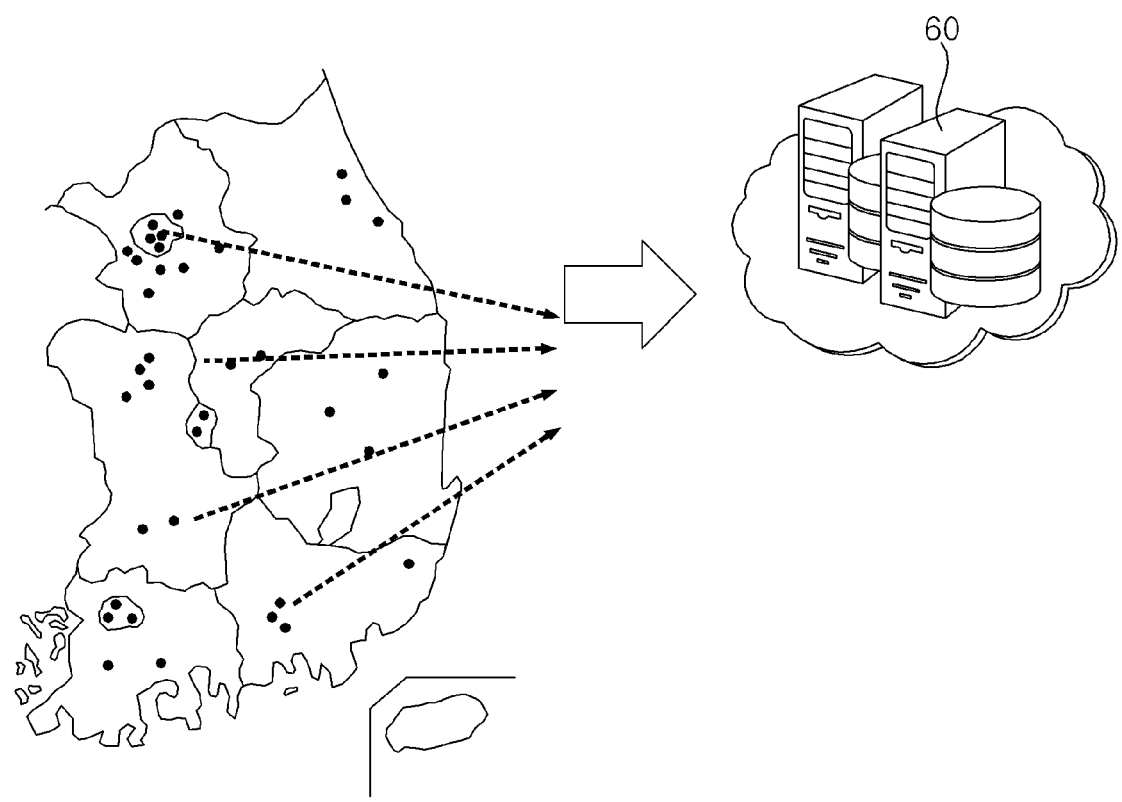
FIG. 13 to FIG. 21 are diagrams referred to in explaining a control algorithm used to control components included in an air conditioner.
Figure 14:
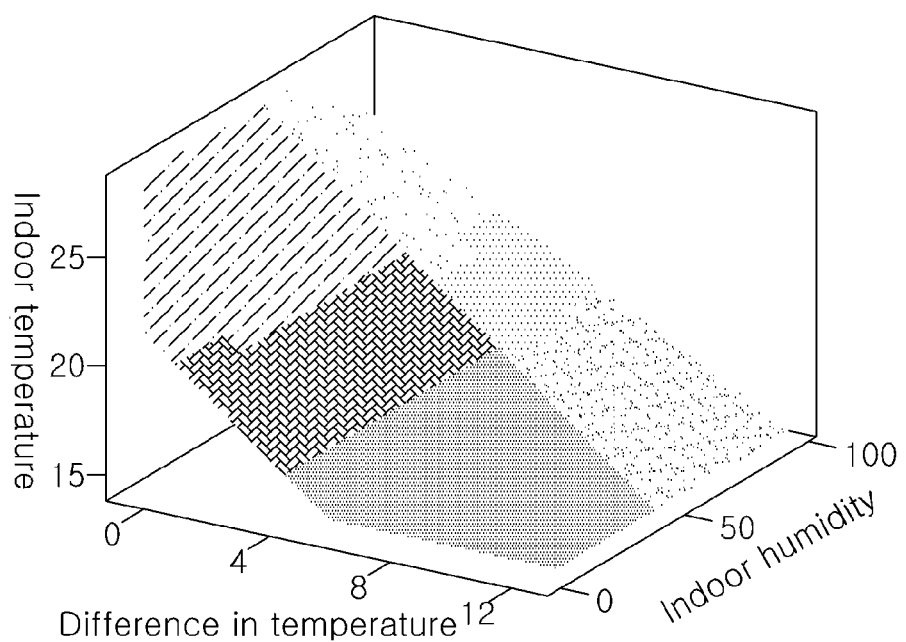

Referring to FIGS. 13 and 14, a plurality of air conditioners 100 may be installed in any of various environments and may transmit data on an indoor temperature, indoor humidity, outdoor temperature, and outdoor humidity measured or input by the air conditioner 100, a target temperature set by a user (hereinafter, referred to as a set temperature), and the like to a server 60.

The server 60 may configure data acquired by the plurality of air conditioners 100 as a database and may cluster, based on the data included in the database, environments of indoor spaces (hereinafter, referred to as an indoor environment), in which indoor units 31 included in the plurality of air conditioners 100 are respectively placed, as a plurality of clusters. Here, the plurality of clusters may refer to a group categorized based on temperature, humidity, and differences between set temperatures and indoor temperatures of indoor environments. For example, the server 60 may cluster indoor environments into a plurality of clusters based on the differences between the set temperatures and the indoor temperatures. In this case, since the data collected from the plurality of air conditioners 100 may have a high ratio of data converging to the set temperature, the server 60 may sample and cluster data by each state of indoor environment.

When there is no data on an indoor humidity among the data received from the plurality of air conditioners 100, the server 60 may calculate an indoor humidity based on an indoor temperature and an outdoor humidity.

Referring to FIG. 14, the server 60 may cluster indoor environments into six clusters with indoor temperatures, indoor humidities, and differences between indoor temperatures and set temperatures used as input values. In this case, the six clusters may be classified based on a sensible heat load and a latent heat load. That is, the indoor environments may be clustered into a space where the sensible heat load and the latent heat load are handled well, a space where only one of the sensible heat load and the latent heat load is handled well, and a space where handling of both the sensible heat load and the latent heat load is required.

In order to cluster indoor environments, a method of grouping data having similar characteristics may be used. That is, based on a similar temperature/humidity or a difference between an indoor temperature and a set temperature, a learning method of grouping by a similar load range required for each indoor unit 31 may be used. In order to divide the indoor environments, an unsupervised learning method may be used because it is common to bundle unlabeled data.

The server 60 may use a K-means algorithm clustering that divides data into several partitions in order to cluster the indoor environments. The K-means algorithm clustering may mean a method in which n centers are taken, a position of a central point n where a sum of distances between centers is minimized is found from among the centers, and neighboring points close to the central point are classified into groups.

Figure 15A:
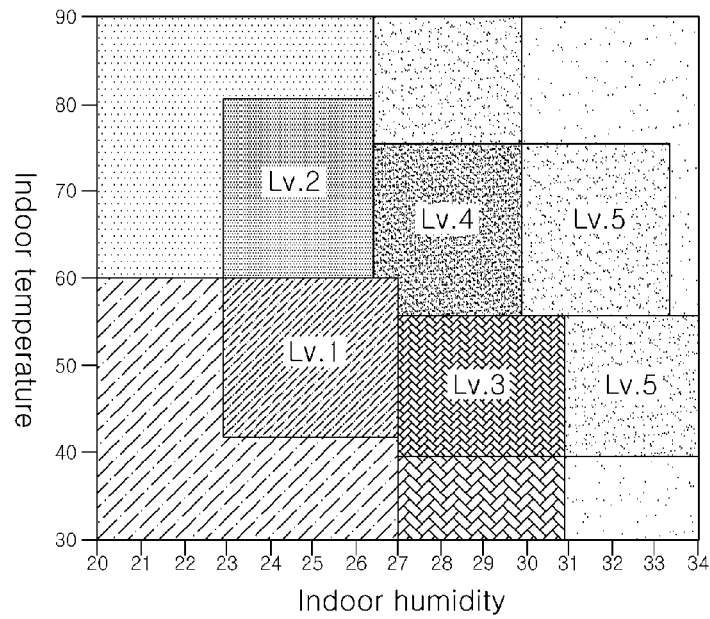
Figure 15B:
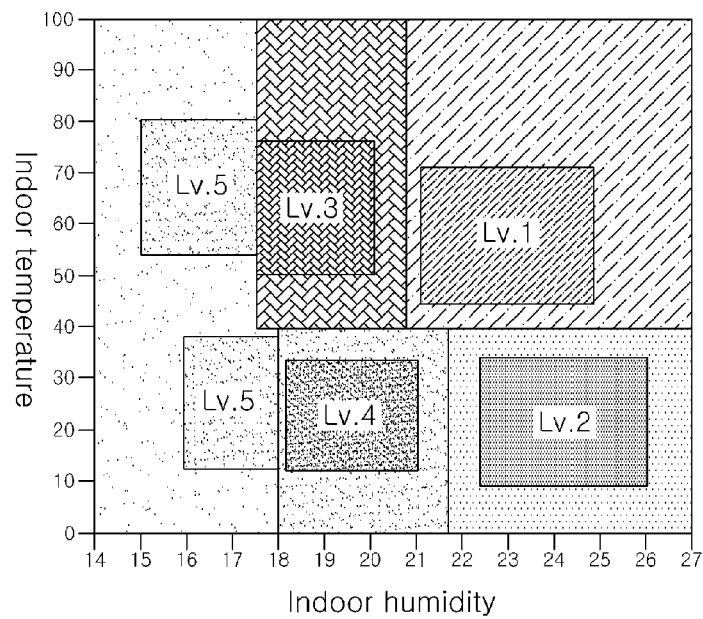

Referring to FIGS. 15A to 15B, indoor environments may be clustered into a first cluster level LV1 where both the sensible heat load and the latent heat load are being handled well, a second cluster level LV2 where the sensible heat load is being handled well while handling of the latent heat load is required, a third cluster level LV3 where the latent heat load is being handled well while handling of the sensible heat load is required, a fourth cluster level LV4 where handling of both the sensible heat load and the latent heat load is required, and a fifth cluster level LV5 where handling of a lot of load is required.

Referring to FIG. 12A, as a cluster level increases, a user in a corresponding indoor space may feel more discomfort. In addition, since the first cluster level LV1 and the second cluster level LV2 have indoor temperatures below a set temperature, the first cluster level LV1 and the second cluster level LV2 may be in a range where the user feels less discomfort compared to the third cluster level LV3 to the fifth cluster level LV5.

Meanwhile, the higher the cluster level is, the greater the load may be required. However, this is merely according to one embodiment, and it is also possible to classify indoor embodiments so that a more load is required for a lower cluster level.

FIG. 12A is a classification of an indoor environment in a cooling mode, and FIG. 12B is a classification of an indoor environment in a heating mode. Even in the heating mode as shown in FIG. 12B, as the cluster level increases, the user may feel more discomfort. Also in FIG. 12B, in the first cluster level LV1 and the second cluster level LV2, the indoor temperatures may be above the set temperature, and thus, the first cluster level LV1 and the second cluster level LV2 may be in a range where the user feels less discomfort compared to the third cluster level LV3 to the fifth cluster level LV5.

The server 60 may generate a learning model for clustering indoor environments (hereinafter, a clustering learning model) and transmit the learning model to the air conditioner 100. The air conditioner 100 may determine a cluster corresponding to an indoor unit 31 based on the clustering learning model received from the server 60. For example, the air conditioner 100 may check indoor temperatures, indoor humidities, differences between set temperatures and indoor temperatures of indoor spaces in which the respective indoor units 31 are placed, and may determine a clustering learning model to generate clusters corresponding to the respective indoor units 31.

The air conditioner 100 may correct the clusters corresponding to the respective indoor units 31 in consideration of change in the indoor environments corresponding to the indoor units 31.

Figure 16:
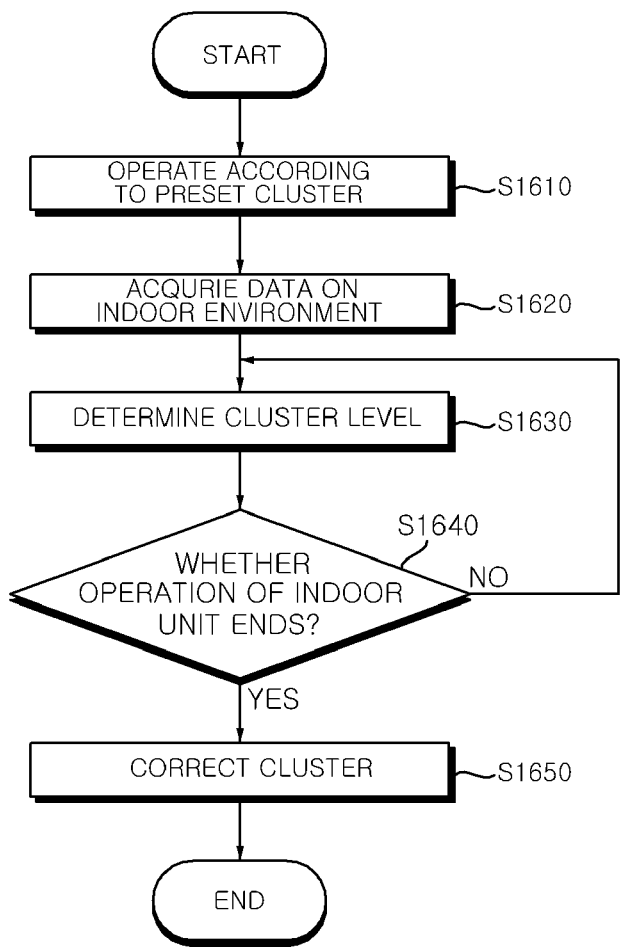

Referring to FIG. 16, in S1610, the air conditioner 100 may control an operation of the indoor unit 31 according to a cluster corresponding to a preset indoor unit 31. For example, when the cluster corresponding to the indoor unit 31 is preset to the first cluster level LV1, the air conditioner 100 may control at least one of components included in the air conditioner based on a control algorithm corresponding to the first cluster level LV1. Control algorithms corresponding to the cluster levels will be described later with reference to FIGS. 15 to FIG. 18.

The air conditioner 100 may acquire data on an indoor environment while in operation in S1620. For example, while the indoor unit 31 is operating, the air conditioner 100 may acquire data on an indoor temperature of an indoor space, an indoor humidity, and a difference between a set temperature and the indoor temperature.

In this case, the air conditioner 100 may pre-process the data in order to control influence of the acquired data in determining a cluster to a certain level. For example, in consideration of a scale difference among a plurality of pieces of data, the air conditioner 100 may perform min-max scaling, in which Equation 1 provided below is used with respect to an input value x of data, in order to convert a plurality of pieces of data into a single data.

$$x' = \frac{x - \min(x)}{\max(x) - \min(x)} \quad \text{[Equation 1]}$$

In S1630 and S1640, while controlling the operation of the indoor unit 31, the air conditioner 100 may determine a cluster level corresponding to a current state of the indoor space in which the indoor unit 31 is placed from among a plurality of clusters. Based on data acquired while in operation and a clustering learning model, the air conditioner 100 may determine a cluster level corresponding to a current state of an indoor environment in a predetermined cycle.

For example, the air conditioner 100 may check proximity between the acquired data and each of the plurality of clusters by calculating Manhattan distance using Equation 2 below, and may determine a cluster level corresponding to a current state of an indoor environment by using the found proximity and the clustering model.

$$d(x, y) = \sum_{i=1}^{n} |x_i - y_i| \quad \text{[Equation 2]}$$

In S1650, the air conditioner 100 may correct the cluster corresponding to the indoor unit 31 when an operation of the indoor unit 31 ends.

The air conditioner 100 may correct the cluster corresponding to the indoor unit 31, in consideration of a proportion of the third cluster level LV3 to the fifth cluster level LV5 relative to a total number of times a cluster level is determined while in operation. For example, when the proportion of the third cluster level LV3 to the fifth cluster level LV5 is 50% or more, the air conditioner 100 may correct a cluster preset to correspond to the indoor unit 31 to a cluster level higher by one step. That is, when the proportion of the third cluster level LV3 to the fifth cluster level LV5 is large, the user may feel discomfort for a long time while the air conditioner 100 is in operation, and thus, it may be determined that the user's comfort level does not change quickly despite the operation of the indoor unit 31. Therefore, by increasing the cluster level of the cluster corresponding to the indoor unit 31, it is possible to quickly change a current comfort level of the indoor space to a comfort level desired by the user when the indoor unit 31 is operated thereafter.

Meanwhile, the air conditioner 100 may increase accuracy of correction for the cluster based on a result of a previous operation. The air conditioner 100 may correct the cluster corresponding to the indoor unit 31, in consideration of a proportion of the third cluster level LV3 to the fifth cluster level LV5 measured in a plurality of operating cycles of the indoor unit 31. Here, an operating cycle of the indoor unit 31 may refer to a period from a point in time when the indoor unit 31 starts operating to a point in time when an operation indoor unit 31 is terminated. Accordingly, the plurality of operating cycles may mean that the start and termination of the operation of the indoor unit 31 have been performed a plurality of times.

Figure 17:
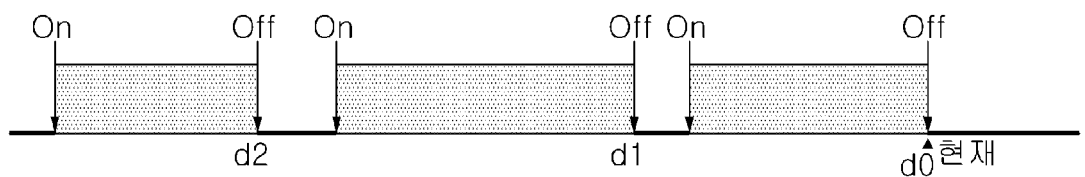

Referring to FIG. 17, a recently completed operation may be set as a first operation period d0 of the indoor unit 31, an operation completed before the first operation period d0 may be set as a second operation period d1 of the indoor unit 31, and an operation completed before the second operation period d1 may be set as a third operation period d2 of the indoor unit 31.

A maximum weight may be given to a ratio d0 of the third cluster level LV3 to the fifth cluster level LV5 measured in the first operation period d0 of the indoor unit 31, and a minimum weight may be given to a ratio d2 of the third cluster level LV3 to the fifth cluster level LV5 measured in the third operation period d2. In addition, an intermediate weight may be given to a ratio d1 of the third cluster level LV3 to the fifth cluster level LV5 measured in the second operation period d2 of the indoor unit 31.

As similarly as shown in Equation 3 below, the air conditioner 100 may determine an indoor state dt during a plurality of operation periods based on a result of weighting each operation period. In this embodiment, a description is provided based on three operating cycles, but the present disclosure is not limited thereto.

$$dt = \frac{3 \times d0 + 2 \times d1 + d2}{6} \quad \text{[Equation 3]}$$

When the indoor state dt in a plurality of operating cycles is 0.5 or greater, the air conditioner 100 may correct the cluster corresponding to the indoor unit 31 to a cluster having a cluster level higher by one step.

In another embodiment, the air conditioner 100 may collect a result of determination of cluster at a predetermined time interval while the indoor unit 31 is operating, and when an average value of cluster levels corresponding to collected clusters is higher than a predetermined reference, the air conditioner 100 may correct the cluster corresponding to the indoor unit 31.

For example, when a value of the fifth cluster level LV5 having a highest cluster level is set to 1, a value of the first cluster level LV1 having a lowest cluster level is set to 0, and values of the second to fourth cluster levels LV2 to LV4 are equally distributed, the predetermined reference may be set to 0.5. In this case, when an average value of cluster levels is higher than the predetermined criterion of 0.5, the air conditioner 100 may correct the cluster corresponding to the indoor unit 31.

The air conditioner 100 may determine and correct a cluster for each of a plurality of indoor spaces in which a plurality of indoor units 31a, 31b, and 31c are installed.

Figure 18:
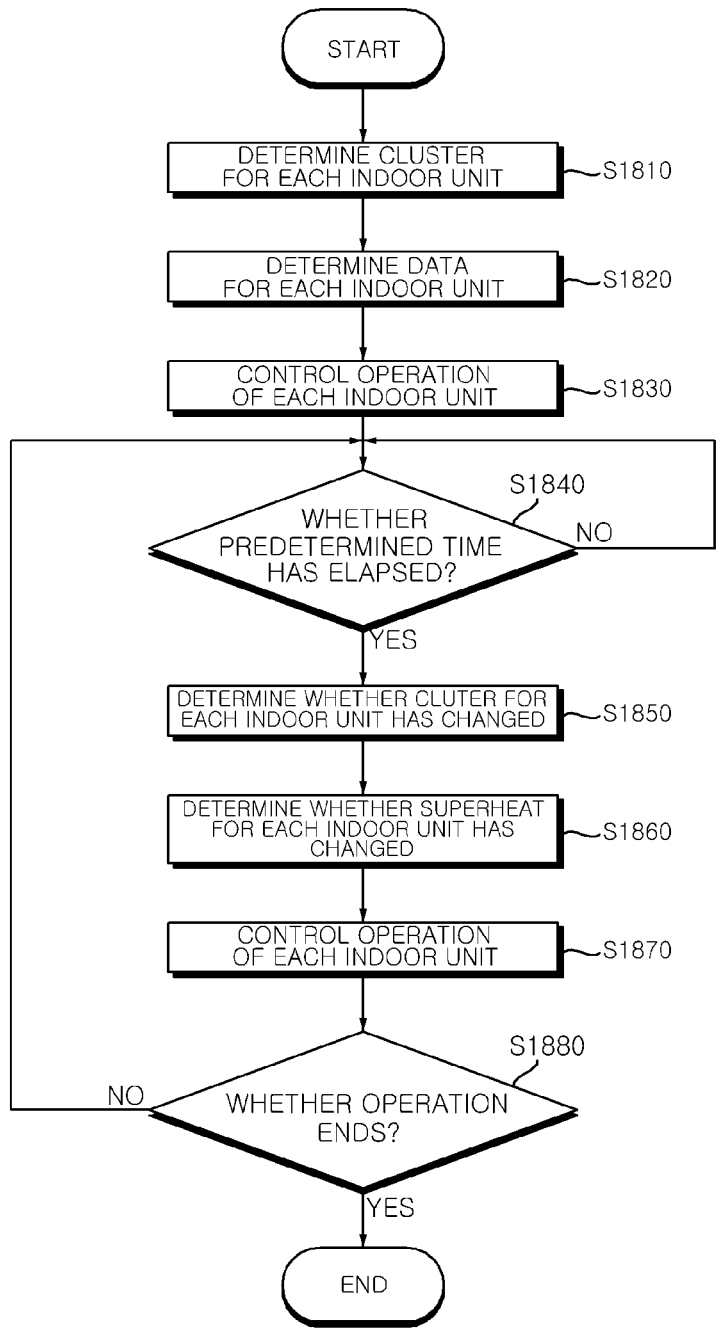
Figures 19, 20:
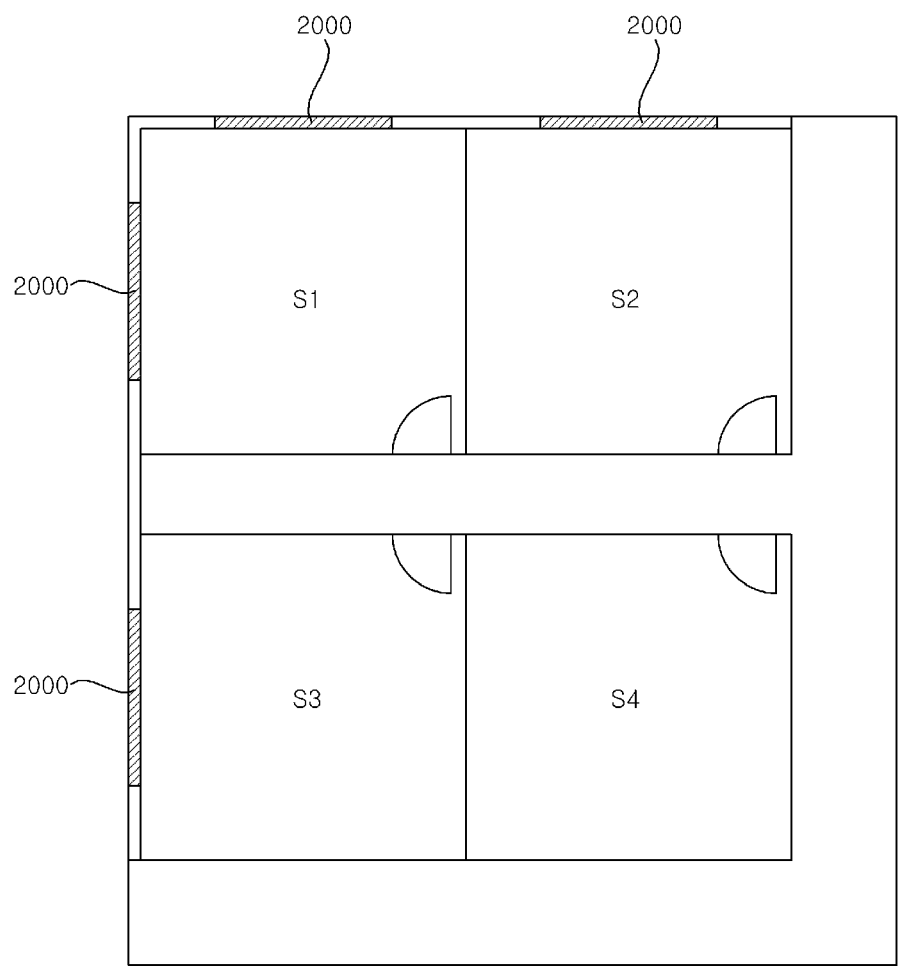

With reference to FIGS. 18 and 19, a method of controlling either or both of the outdoor unit 21 and at least one indoor unit 31 by using at least one control algorithm corresponding to a cluster will be described. Hereinafter, a case in which the air conditioner 100 includes the plurality of indoor units 31a, 31b, and 31c according to an embodiment will be described, but the present disclosure is not limited thereto.

Referring to FIG. 18, when the air conditioner is set to a second mode in S1810, the air conditioner 100 may determine a cluster for each of the plurality of indoor units 31a, 31b, and 31c.

In S1820, the air conditioner 100 may acquire data for each indoor unit on each indoor space in which each of the plurality of indoor units 31a, 31b, and 31c is placed. For example, the air conditioner 100 may acquire data on the number of indoor units currently in operation among the plurality of indoor units 31a, 31b, and 31c connected to the outdoor unit 21, indoor temperatures of the indoor spaces, indoor humidities, set temperatures, and the like. For example, the air conditioner 100 may acquire, through at least one sensor, camera, etc., data on the number of occupants present in each of the indoor spaces in which the plurality of indoor units 31a, 31b, and 31c are placed.

In S1830, the air conditioner 100 may control an operation of each of the plurality of indoor units 31a, 31b, and 31c.

The air conditioner 100 may determine a total load required for the plurality of indoor units 31a, 31b, and 31c based on an operation rate of each of the plurality of indoor units 31a, 31b, and 31c, and may determine an amount of refrigerant discharged from the compressor 110 based on the determined total load.

The air conditioner 100 may control indoor expansion valves 35a to 35c included in the plurality of indoor units 31a, 31b, and 31c, respectively, depending on which cluster each of the indoor units corresponds to. For example, a controller 370 provided in the outdoor unit 21 may transmit data on a preset cluster to each of the plurality of indoor units 31a, 31b, and 31c. In this case, the plurality of indoor units 31a, 31b, and 31c may regulate the indoor expansion valves 35a to 35c so that an amount of refrigerant flowing increases as the cluster level is higher, and may regulate the indoor expansion valves so that an amount of refrigerant flowing decreases as the cluster level is lower.

The air conditioner 100 may control an indoor fan and/or a vane included in each of the plurality of indoor units 31a, 31b, and 31c depending on which cluster each indoor unit corresponds to.

In S1840, the air conditioner 100 may determine whether a preset time has elapsed. Here, the preset time may refer to a time corresponding to a period of updating settings of the plurality of indoor units 31a, 31b, and 31c.

In S1850, the air conditioner 100 may check whether a cluster for each of the plurality of indoor units 31a, 31b, and 31c has changed. For example, the air conditioner 100 may check whether at least one cluster for each indoor unit has changed as an operating cycle of at least one of the plurality of indoor units 31a, 31b, and 31c is completed during a set time.

In S1860, the air conditioner 100 may check change in superheat for each of the plurality of indoor units 31a, 31b, and 31c. Here, the change in superheat may refer to an amount of heat additionally required or reduced according to a change in the number of occupants present in an indoor space. For example, the air conditioner 100 may check whether the number of occupants in at least one of the indoor spaces in which the plurality of indoor units 31a, 31b, and 31c are placed has changed during a set time.

Referring to FIG. 19, a change in superheat may be determined based on change in the number of occupants. In FIG. 19, A0 may denote a maximum required superheat, and A4 may denote a minimum required superheat.

The higher the cluster level of a cluster corresponding to an indoor unit 31, the higher the superheat may be formed. In addition, even in the case of having the same cluster level, superheat may vary according to an increase/decrease in the number of occupants. In addition, the lower the cluster level, the easier the target superheat may vary according to a change in the number of occupants.

In S1870, the air conditioner 100 may control the operation of each of the plurality of indoor units 31a, 31b, and 31c in consideration of change of a cluster for each indoor unit and/or change of superheat. For example, the controller 370 provided in the outdoor unit 21 may transmit data on a changed cluster to an indoor unit whose cluster has been changed among the plurality of indoor units 31a, 31b, and 31c. For example, the controller 370 provided in the outdoor unit 21 may transmit data on changed superheat to an indoor unit having the changed superheat among the plurality of indoor units 31a, 31b, and 31c.

In this case, the plurality of indoor units 31a, 31b, and 31c may regulate the indoor expansion valves 35a to 35c according to a changed cluster and/or a changed superheat. In addition, the plurality of indoor units 31a, 31b, and 31c may control an indoor fan and/or vane according to a changed cluster and/or a changed superheat.

In S1880, the air conditioner 100 may determine whether the operation using the control algorithm ends. For example, when the operations of the plurality of indoor units 31a, 31b, and 31c are all stopped, or when the operation mode is switched from the second mode to the first mode, the air conditioner 100 may determine that an operation using the control algorithm ends.

Meanwhile, the air conditioner 100 may add a power quantity consumed by each of the plurality of indoor units 31a, 31b, and 31c to the power quantity database. For example, the air conditioner 100 may distribute actual power quantities and/or estimated power quantities consumed by the air conditioner 100 to the plurality of indoor units 31a, 31b, and 31c, respectively, according to a cluster level, an operating time, a rotational speed of an indoor fan, and the like. In this case, the air conditioner 100 may determine that the actual power quantities and/or estimated power quantities distributed to the plurality of indoor units 31a, 31b, and 31c, respectively, are power quantities consumed by the plurality of indoor units 31a, 31b, and 31c, respectively.

Meanwhile, with reference to FIGS. 20 and 21, a method of controlling either or both of the outdoor unit 21 and at least one indoor unit 31 by using at least one control algorithm for determining a flow rate of refrigerant will be described. Hereinafter, a case in which an air conditioner 100 includes a plurality of indoor units 31a, 31b, 31c, and 31d according to an embodiment will be described, but the present disclosure is not limited thereto.

Referring to FIG. 20, environments of A plurality of indoor spaces S1 to S4 in which the plurality of indoor units 31a, 31b, 31c, and 31d are respectively placed may be different from each other.

In a first indoor space S1 in which a first indoor unit 31a is installed, windows 2000 communicating with the outside may be provided at two wall surfaces of the entire wall surfaces included in the first indoor space S1. In contrast, in each of second and third indoor spaces S2 and S3 in which second and third indoor units 31b and 31c are installed, a window 2000 is provided at only one wall surface and no window 2000 may be provided in a fourth indoor space S4 in which a fourth indoor unit 31d is installed.

Meanwhile, when it comes to solar radiation for the plurality of indoor spaces S1 to S4, the solar radiation may be largest in the first indoor space S1 and the solar radiation may be least in the fourth indoor space S4, depending on the arrangement of the windows 2000. In addition, power quantities consumed by the plurality of indoor units 31a, 31b, 31c and 31d may be different from each other in response to the solar radiation for the plurality of indoor spaces S1 to S4. For example, in the case of the first indoor space S1, since the solar radiation is relatively larger than in other indoor spaces, a power quantity consumed by the first indoor unit 31a during a cooling operation may be greater than those of the other indoor units 31b, 31c, and 31d.

As described above, a power quantity consumed by an indoor unit 31 may vary depending on an indoor environment of each of a plurality of indoor spaces in which the indoor unit 31 is actually installed, the air conditioner 100 may control either or both of the outdoor unit 21 and at least one indoor unit 31 by using a control algorithm that considers the indoor environments of the plurality of indoor spaces in which the indoor unit 31 is actually installed.

Figure 21:
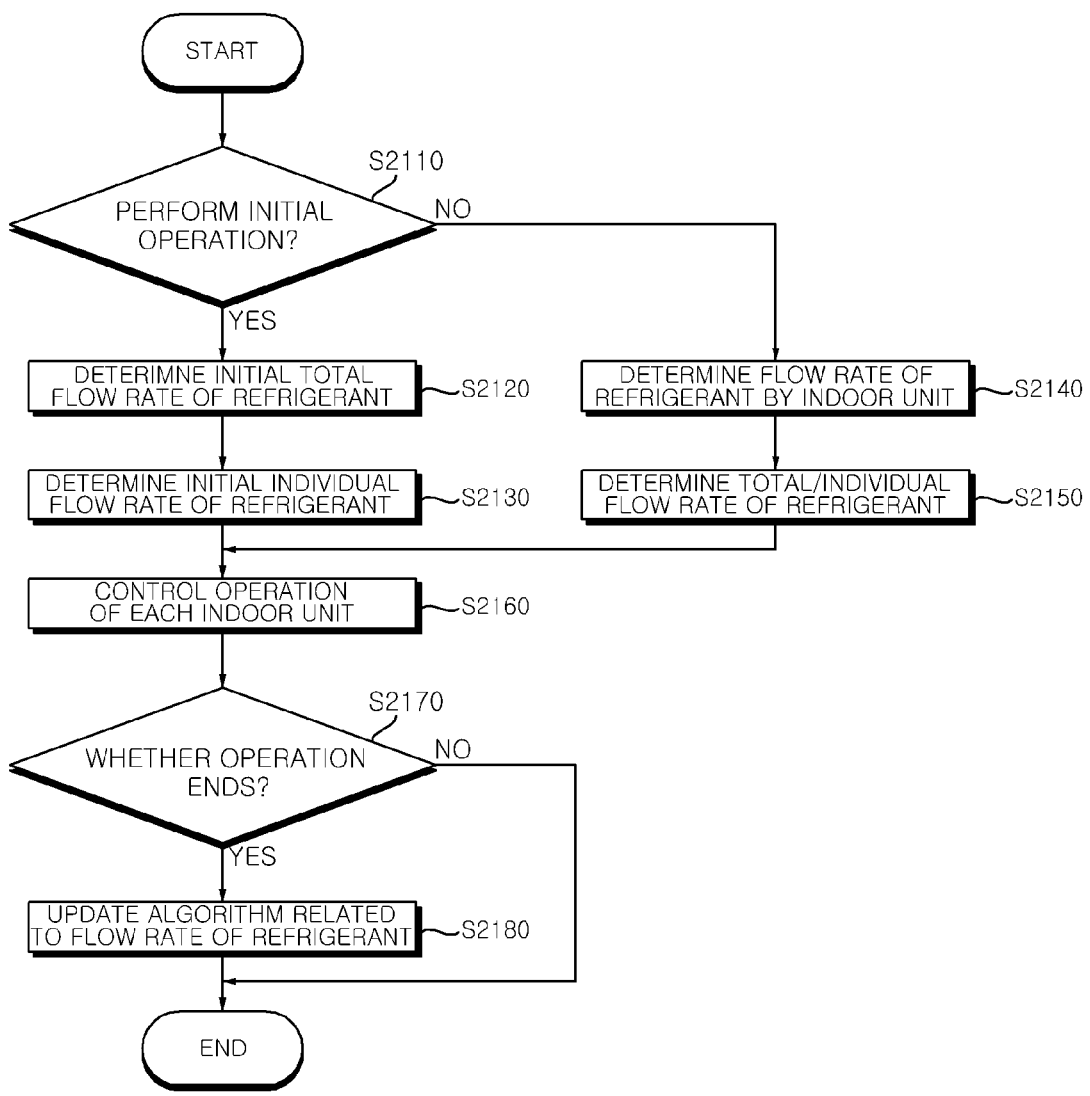

Referring to FIG. 21, in S2110, when the air conditioner is set to a second mode, an air conditioner 100 may determine whether an initial operation is performed. For example, the air conditioner 100 may perform an initial operation from a point in time when an operation of a compressor 110 of the outdoor unit 21 starts until a predetermined time elapses.

In S2120, when performing the initial operation, the air conditioner 100 may determine an initial total flow rate of refrigerant supplied to the plurality of indoor units 31a, 31b, 31c, and 31d.

According to an embodiment, the air conditioner 100 may calculate a power quantity expected to be consumed by the air conditioner 100 based on data accumulated in a power quantity database of storage 330. For example, a controller 370 provided in the outdoor unit 21 may calculate a power quantity expected to be consumed by the air conditioner 100, which corresponds to the data accumulated in the power quantity database, based on a previously learned first control algorithm related to a flow rate of refrigerant. In this case, the air conditioner 100 may determine an initial total flow rate of the refrigerant to correspond to the power quantity expected to be consumed by the air conditioner 100.

According to an exemplary embodiment, the air conditioner 100 may determine a total initial flow rate of refrigerant based on the total flow rate of refrigerant supplied to the plurality of indoor units 31a, 31b, 31c, and 31d during a previous operation, which are stored in the storage 330. For example, based on the previously learned first control algorithm, the controller 370 provided in the outdoor unit 21 may determine a total initial flow rate of refrigerant corresponding to a total flow rate of refrigerant supplied to the plurality of indoor units 31a, 31b, 31c, and 31d during a previous operation. Meanwhile, the first control algorithm may be a previously learned algorithm that employs an exponential smoothing method. Here, the exponential smoothing method may refer to a method in which a greatest weight is given to latest data and the weight is geometrically reduced as a point in time of accumulation in the database is earlier than a current point in time.

Meanwhile, when determining the initial total flow rate of the refrigerant, the air conditioner 100 may determines the initial total flow rate of the refrigerant based on a current indoor temperature, a current outdoor temperature, an indoor temperature and/or outdoor temperature after a current point in time, and the like. For example, the air conditioner 100 may access a server, which provides weather data, through a communication part 310 to receive data on the indoor temperature and/or outdoor temperature after the current point in time and may determine an initial total flow rate of refrigerant based on the received data. In this case, as the indoor temperature and/or outdoor temperature after the current point in time are higher, the initial total flow rate of the refrigerant may also increase.

In S2130, the air conditioner 100 may determine an initial individual flow rate of refrigerant supplied to each of the plurality of indoor units 31a, 31b, 31c and 31d based on the initial total flow rate of refrigerant. In this case, the air conditioner 100 may determine the initial individual flow rate of refrigerant supplied to each indoor unit in operation among the plurality of indoor units 31a, 31b, 31c, and 31d.

According to an exemplary embodiment, the air conditioner 100 may provide an initial individual flow rate of refrigerant based on a difference between an indoor temperature and an outdoor temperature of each indoor space in which each of the plurality of indoor units 31a, 31b, 31c, and 31d are installed. For example, when a difference between an indoor temperature and an outdoor temperature of the first indoor space S1 is greater than a difference between an indoor temperature and an outdoor temperature of the fourth indoor space S4, the controller 370 provided in the outdoor unit 21 may determine an initial individual flow rate of refrigerant so that a flow rate of refrigerant supplied to the first indoor unit 31a installed in the first indoor space S1 is greater than a flow rate of refrigerant supplied to the fourth indoor unit 31d installed in the fourth indoor space S4.

According to an exemplary embodiment, the air conditioner 100 may calculate a power quantity expected to be consumed by each of the plurality of indoor units 31a, 31b, and 31c based on data accumulated in the power quantity database of the storage 330. For example, based on the previously learned first control algorithm, the controller 370 provided in the outdoor unit 21 may calculate a power quantity expected to be consumed by each of the plurality of indoor units 31a, 31b, and 31c, which corresponds to the data accumulated in the power quantity database. In this case, the air conditioner 100 may determine an initial individual flow rate of refrigerant to correspond to the power quantity expected to be consumed by each of the plurality of indoor units 31a, 31b, and 31c.

According to an exemplary embodiment, the air conditioner 100 may determine an initial flow rate of refrigerant, based on an individual flow rate of refrigerant supplied to each of the plurality of indoor units 31a, 31b, 31c, and 31d during a previous operation, which are stored in the storage 330. For example, based on a first control algorithm previously learned, the controller 370 provided in the outdoor unit 21 may determine an initial individual flow rate of refrigerant to corresponds to an individual flow rate of refrigerant supplied to each of the plurality of indoor units 31a, 31b, 31c, and 31d during a previous operation.

Meanwhile, in S2140, when it is determined that a current operation is not an initial operation, the air conditioner 100 may determine an individual flow rate of refrigerant supplied to each of the plurality of indoor units 31a, 31b, 31c, and 31. For example, each of the plurality of indoor units 31a, 31b, 31c, and 31d may transmit data on the determined individual flow rate of refrigerant to the controller 370 provided in the outdoor unit 21.

According to an embodiment, the air conditioner 100 may calculate a power quantity consumed by each of the plurality of indoor units 31a, 31b, and 31c based on an actual power quantity consumed by each of the plurality of indoor units 31a, 31b, and 31c in a second mode. In this case, a controller 370 provided in each of the plurality of indoor units 31a, 31b, 31c, and 31d may determine an individual flow rate of refrigerant based on a previously learned second control algorithm related to a flow rate of refrigerant. For example, based on the second control algorithm, the controller 370 provided in each of the plurality of indoor units 31a, 31b, 31c, and 31d may determine an individual flow rate of refrigerant to correspond to a power quantity consumed by each of the plurality of indoor units 31a, 31b, and 31c, a difference between an indoor temperature and an outdoor temperature of each indoor space in which each of the plurality of indoor units 31a, 31b, 31c, and 31d is installed, a set temperature, a rotational speed of an indoor fan, and the like.

Meanwhile, the second control algorithm may be a previously learned algorithm in which an actual power quantity and/or estimated power quantity consumed by the air conditioner 100, a power quantity consumed by each of the plurality of indoor units 31a, 31b, and 31c, an indoor temperature, an outdoor temperature, a rotational speed of an indoor fan, and the like are set as input values whereas a total flow rate of refrigerant and an individual flow rate of refrigerant are set as output values.

In S2150, the air conditioner 100 may determine a total flow rate and/or individual flow rate of refrigerant supplied to the plurality of indoor units 31a, 31b, 31c and 31d based on the individual flow rates of refrigerant determined in the plurality of indoor units 31a, 31b, 31c and 31d.

According to an exemplary embodiment, the controller 370 provided in the outdoor unit 21 may receive data on individual flow rates of refrigerant from the plurality of indoor units 31a, 31b, 31c, and 31d, and may add up the received individual flow rates of refrigerant from the plurality of indoor units 31a, 31b, 31c, 31d. In this case, the controller 370 provided in the outdoor unit 21 may correct a result of adding up the individual flow rates of refrigerant in consideration of an actual and/or estimated power quantity consumed by the air conditioner 100, an operation rate of each of the plurality of indoor units 31a, 31b, 31c, and 31d, indoor and outdoor temperature of each indoor space in which each of the plurality of indoor units 31a, 31b, 31c, and 31d is installed, and the like. For example, based on the second control algorithm, the controller 370 provided in the outdoor unit 21 may determine a correction result, which is obtained by correcting the result of adding up the individual flow rates of refrigerant, as a total flow rate of refrigerant.

According to an embodiment, the controller 370 provided in the outdoor unit 21 may determine an individual flow rate of refrigerant supplied to each of the plurality of indoor units 31a, 31b, 31c, and 31d, respectively, to correspond to the total flow rate of refrigerant. For example, using the second control algorithm, the controller 370 provided in the outdoor unit 21 may determine an individual flow rate of refrigerant supplied to each of the plurality of indoor units 31a, 31b, 31c, and 31d in consideration of an actual power quantity and/or estimated power quantity consumed by the air conditioner 100, an operation rate of each of the plurality of indoor units 31a, 31b, 31c, and 31d, indoor temperature and outdoor temperature of each indoor space in which each of the plurality of indoor units 31a, 31b, 31c, and 31d are installed, and the like.

That is, based on the actual power quantity and/or estimated power quantity consumed by the air conditioner 100, the operation rate of each of the plurality of indoor units 31a, 31b, 31c, and 31d, and the like, the air conditioner 100 may correct the individual flow rate of refrigerant determined by each of the plurality of indoor units 31a, 31b, 31c, and 31d according to an indoor environment of each indoor space.

In S2160, the air conditioner 100 may control an operation of each of the plurality of indoor units 31a, 31b, 31c, and 31d. For example, the controller 370 provided in the outdoor unit 21 may control an amount of refrigerant discharged from the compressor 110 based on the total flow rate of the refrigerant. For example, the controller 370 provided in the outdoor unit 21 may transmit data on the individual flow rates of refrigerant determined for the plurality of indoor units 31a, 31b, 31c, and 31d to the plurality of indoor units 31a, 31b, 31c, 31d, respectively. In this case, the plurality of indoor units 31a, 31b, 31c, and 31d may regulate the indoor expansion valves 35a to 35d based on the data on individual flow rates of refrigerant received from the outdoor unit 21.

In S2170, the air conditioner 100 may check whether the operation ends.

In S2180, when the operation ends, the air conditioner 100 may update at least one control algorithm related to determining a flow rate of refrigerant. For example, the air conditioner 100 may update the first control algorithm based on a difference between the initial total flow rate of refrigerant determined in S2120 and the total flow rate of refrigerant determined in S2160. For example, the air conditioner 100 may update the first control algorithm based on a difference between the initial individual flow rate of refrigerant determined in S2130 and the individual flow rate of refrigerant determined in S2160. As described above, according to various embodiments of the present disclosure, by using a power quantity learning model related to an actual power quantity consumed by the air conditioner 100 in the first mode, it is possible to calculate and compare the actual power quantity consumed in the first mode and an actual power quantity consumed in the second mode under the same conditions.

In addition, according to various embodiments of the present disclosure, by repeatedly re-training a power quantity learning model based on a power quantity calculated using the power quantity learning model and an actual power quantity consumed by an air conditioner while an operation of the air conditioner is set to a normal operation mode, it is possible to improve accuracy of a result of calculating a power quantity expected to be used in the normal mode while the operation mode of the air conditioner is set to a smart operation mode.

An aspect of the present disclosure aims to solve the above and other problems.

Another aspect of the present disclosure provides an air conditioner capable of calculating an actual power quantity consumed in a currently set smart operation mode and a power quantity expected to be used in a currently unset normal operation mode under the same conditions when the air conditioner is set to the smart operation mode, and an operation method of the air conditioner.

Yet another aspect of the present disclosure provides an air conditioner capable of providing a user with information on a power quantity to be saved in comparison with a normal operation mode when a smart operation mode is set, and an operation method of the air conditioner. Yet another aspect of the present disclosure provides an air conditioner capable of improving accuracy of a result of calculating a power quantity expected to be used during a normal operation mode by training a power quantity learning model based on a data acquired during the normal operation mode, and an operation method of the air conditioner.

Yet another aspect of the present disclosure provides an air conditioner capable of correcting a result of calculating the power quantity expected to be used in a normal operation mode in consideration of an error range for a result value calculated through a power quantity learning model, and an operation method of the air conditioner.

Yet another aspect of the present disclosure provides an air conditioner capable of calculating an actual power quantity consumed based on data received from an external device such as a power meter and/or data corresponding to an operation of a predetermined compartment, and an operation method of the air conditioner.

Yet another aspect of the present disclosure provides an air conditioner capable of managing a history of power quantity usage by updating a database on a power quantity expected to be used and an actual power quantity consumed in a predetermined operation mode, and an operation method of the air conditioner.

Yet another aspect of the present disclosure provides an air conditioner capable of regulating a flow rate of refrigerant supplied to an indoor unit by using various control algorithms when a smart operation mode is set, and an operation method of the air conditioner.

Yet another aspect of the present disclosure provides an air conditioner capable of providing various user interfaces related to a power quantity according to a currently set operation mode, and an operation method of the air conditioner.

The objects of the present disclosure are not limited to the objects mentioned above, and other objects not mentioned will be clearly understood by those skilled in the art from the following description.

In an aspect of the present disclosure, an air conditioner according to various embodiments of the present disclosure may train a power quantity learning model related to an actual power quantity consumed by the air conditioner while a first mode is set.

According to an embodiment of the present disclosure, while a second mode different from the first mode is set, the air conditioner may calculate, using a power quantity learning model, an estimated power quantity expected to be consumed by the air conditioner in the first mode.

According to an embodiment of the present disclosure, the air conditioner may compare the estimated power quantity expected to be consumed by the air conditioner in the first mode with the actual power quantity consumed by the air conditioner in the second mode.

According to an embodiment of the present disclosure, the air conditioner may include: an outdoor unit having a compressor for compressing a refrigerant; at least one indoor unit; a storage configured to store a control algorithm previously learned to control of a component included in the air conditioner; and a controller.

According to an embodiment of the present disclosure, the controller may be configured to, in response to the air conditioner being set to a first mode, control either or both of an outdoor unit and at least one indoor unit, regardless of a control algorithm.

According to an embodiment of the present disclosure, the controller may be configured to, in response to the air conditioner being set to a second mode, control either or both of the outdoor unit and the at least one indoor unit based on the control algorithm.

According to an embodiment of the present disclosure, the controller may be configured to calculate the actual power quantity consumed by the air conditioner based on any one of an operating frequency of the compressor and data on a power quantity consumed by the air conditioner received from an external device.

According to an embodiment of the present disclosure, the controller may be configured to, in response to the air conditioner being set to the first mode, calculate the estimated power quantity corresponding to the first mode, by using a first data acquired for a predetermined time and the power quantity learning model.

According to an embodiment of the present disclosure, the controller may be configured to, when a difference between the estimated power quantity corresponding to the first mode and the actual power quantity consumed by the air conditioner for the predetermined time is equal to or greater than a present reference, train the power quantity learning model based on the first data acquired for the predetermined time.

According to an embodiment of the present disclosure, the controller may be configured to determine a weight and a bias of the power quantity learning model by learning a correlation between the first data acquired for the predetermined time and the actual power quantity consumed by the air conditioner for the predetermined time.

According to an embodiment of the present disclosure, the storage may store a database, and the controller may be configured to, in response to the air conditioner being set to the first mode, add a first estimated power quantity calculated based on the first data acquired for the predetermined time and the actual power quantity consumed by the air conditioner for the predetermined time to the database.

According to an embodiment of the present disclosure, the controller may be configured to, in response to the air conditioner being set to the second mode, add a second estimated power quantity calculated based on the second data acquired for the predetermined time and the actual power quantity consumed by the air conditioner for the predetermined time to the database.

According to an embodiment of the present disclosure, the controller may be configured to delete data added to the database before a preset period from a current point in time from among data included in the database.

According to an embodiment of the present disclosure, the controller may be configured to, in response to the air conditioner being set to the first mode, calculate the first estimated power quantity calculated based on the first data acquired for the predetermined time as a same value as the actual amount of power consumed by the air conditioner for the predetermined time.

According to an embodiment of the present disclosure, the controller may be configured to determine a minimum value and a maximum value of the estimated power quantity to correspond to pressure of refrigerant flowing into the compressor while the second mode is set.

According to an embodiment of the present disclosure, the controller may be configured to, in response to the estimated power quantity being calculated to be less than the minimum value, determine the minimum value as an estimated power quantity corresponding to the second mode.

According to an embodiment of the present disclosure, the controller may be configured to, in response to the estimated power quantity calculated to exceed the maximum value, determine the maximum value as the estimated power quantity corresponding to the second mode.

According to an embodiment of the present disclosure, the controller may be configured to, in response to the air conditioner being set to the second mode, determine a cluster for each of the at least one indoor unit.

According to an embodiment of the present disclosure, the controller may be configured to determine a flow rate of refrigerant supplied to each of the at least one indoor unit based on the cluster for each of the at least one indoor unit and the second data.

According to an embodiment of the present disclosure, the controller may be configured to determine a total flow rate of refrigerant supplied to the outdoor unit based on a flow rate of the refrigerant supplied to the at least one indoor unit.

According to an embodiment of the present disclosure, the controller may be configured to, in response to the air conditioner being set to the second mode, determine whether an initial operation is performed.

According to an embodiment of the present disclosure, the controller may be configured to, in response to the initial operation being performed, determine a flow rate of refrigerant supplied to the at least one indoor unit based on a first control algorithm that employs an exponential smoothing method.

According to an embodiment of the present disclosure, the controller may be configured to, in response to the initial operation being not performed, determine the flow rate of refrigerant supplied to the at least one indoor unit based on a second control algorithm that is previously learned regarding a correlation between the second data and the flow rate of the refrigerant.

Meanwhile, an air conditioner according to an embodiment of the present disclosure may include: an outdoor unit having a compressor for compressing a refrigerant; at least one indoor unit; a storage configured to store a control algorithm previously learned to control of a component included in the air conditioner; a display; and a controller.

Meanwhile, according to various embodiments of the present disclosure, the controller may be configured to output, through the display, a screen with at least one of an actual power quantity consumed by the air conditioner while the second mode is set, the estimated power quantity, and the power saving rate.

According to various embodiments of the present disclosure, the controller may be configured to output, through the display, a first screen related to the actual power quantity consumed by the air conditioner while set to the first mode, and to output, through the display, a second screen related to the actual power quantity consumed by the air conditioner and the estimated power quantity while the second mode is set.

In another aspect of the present disclosure, an operation method of an air conditioner may include a first control operation of, while the air conditioner is set to a first mode, controlling either or both of the outdoor unit and the at least one indoor unit, irrespective of a control algorithm previously learned to control a component included in the air conditioner.

According to an embodiment of the present disclosure, the operation method of the air conditioner may include a training operation of training, based on first data acquired while the first mode is set, a learning model regarding an actual power quantity consumed by the air conditioner while the first mode is set.

According to an embodiment of the present disclosure, the operation method may include a second control operation of controlling either or both of the outdoor unit and the at least one indoor unit based on the control algorithm when the air conditioner is set to a second mode.

According to an embodiment of the present disclosure, the operation method may include a result calculating operation of calculating an estimated power quantity corresponding to the second mode is calculated based on the power quantity learning model and the second data acquired while the second mode is set and of calculating an actual power quantity consumed by the air conditioner while the second mode is set.

According to an embodiment of the present disclosure, the result calculating operation may be an operation of calculating the actual power quantity consumed by the air conditioner based on any one of an operating frequency of the compressor and data on a power quantity consumed by the air conditioner received from an external device.

According to an embodiment of the present disclosure, the training operation may include acquiring the first data for a predetermined time when the air conditioner is set to the first mode.

According to an embodiment of the present disclosure, the training operation may include calculating an estimated power quantity corresponding to the first mode by using the first data acquired for the predetermined time and the power quantity learning model.

According to an embodiment of the present disclosure, the training operation may include, when a difference between the estimated power quantity corresponding to the first mode and the actual power quantity consumed by the air conditioner for the predetermined time is equal to or greater than a present reference, training the power quantity learning model based on the first data acquired for the predetermined time.

According to an embodiment of the present disclosure, the training of the power quantity learning model may be determining a weight and a bias of the power quantity learning model by learning a correlation between the first data acquired for the predetermined time and the actual power quantity consumed by the air conditioner for the predetermined time.

According to an embodiment of the present disclosure, the operation method may include, in response to the air conditioner being set to the first mode, adding a first estimated power quantity calculated based on the first data acquired for the predetermined time and the actual power quantity consumed by the air conditioner for the predetermined time to a database.

According to an embodiment of the present disclosure, the operation method may include, in response to the air conditioner being set to the second mode, adding a second estimated power quantity calculated based on the second data acquired for the predetermined time and the actual power quantity consumed by the air conditioner for the predetermined time to the database.

According to an embodiment of the present disclosure, the operation method may include deleting data added to the database before a preset period from a current point in time from among data included in the database.

According to an embodiment of the present disclosure, the adding to the database in consideration of dates and times may include, in response to the air conditioner being set to the first mode, calculating the first estimated power quantity calculated based on the first data acquired for the predetermined time as a same value as the actual amount of power consumed by the air conditioner for the predetermined time.

According to an embodiment of the present disclosure, the result calculating operation may include determining a minimum value and a maximum value of the estimated power quantity to correspond to pressure of refrigerant flowing into the compressor while the second mode is set.

According to an embodiment of the present disclosure, the result calculating operation may include, in response to the estimated power quantity being calculated to be less than the minimum value, determining the minimum value as an estimated power quantity corresponding to the second mode.

According to an embodiment of the present disclosure, the result calculating operation may include, in response to the estimated power quantity calculated to exceed the maximum value, determining the maximum value as the estimated power quantity corresponding to the second mode.

According to an embodiment of the present disclosure, the first control operation may include, in response to the air conditioner being set to the second mode, determining a cluster for each of the at least one indoor unit According to an embodiment of the present disclosure, the first control operation may include determining a flow rate of refrigerant supplied to each of the at least one indoor unit based on the cluster for each of the at least one indoor unit and the second data.

According to an embodiment of the present disclosure, the second control operation may include, in response to the air conditioner being set to the second mode, determining whether an initial operation is performed.

According to an embodiment of the present disclosure, the second control operation may include, in response to the initial operation being not performed, determining the flow rate of refrigerant supplied to the at least one indoor unit based on a second control algorithm that is previously learned regarding a correlation between the second data and the flow rate of the refrigerant.

According to an embodiment of the present disclosure, the second control operation may include, in response to the initial operation being not performed, determining the flow rate of refrigerant supplied to the at least one indoor unit based on a second control algorithm that is previously learned regarding a correlation between the second data and the flow rate of the refrigerant.

According to an embodiment of the present disclosure, the second control operation may further include determining a total flow rate of refrigerant supplied to the outdoor unit based on a flow rate of the refrigerant supplied to the at least one indoor unit.

Meanwhile, according to various embodiments of the present disclosure, the operation method may further include outputting, through a display, a screen including at least one of an actual power quantity consumed by the air conditioner while the second mode is set, the estimated power quantity, and the power saving rate.

Meanwhile, the operation method of the air conditioner may include: outputting, through the display, a first screen related to the actual power quantity consumed by the air conditioner while the first mode is set; and outputting, through the display, a second screen related to the actual power quantity consumed by the air conditioner and the estimated power quantity while the second mode is set.

The details of other embodiments are included in the detailed description and drawings.

According to various embodiments of the present disclosure, there is one or more of the following effects.

According to various embodiments of the present disclosure, when the air conditioner is set to a smart operation mode, it is possible to calculate and compare a power quantity expected to be used in a general operation mode and an actual power quantity consumed in the smart operation mode together under the same conditions.

In addition, according to various embodiments of the present disclosure, when the air conditioner is set to the smart operation mode, it is possible to provide a user with information on a power quantity to be saved in comparison with the normal operation mode.

In addition, according to various embodiments of the present disclosure, while an operation mode of the air conditioner 100 is set to a normal operation mode, by repeatedly re-training a power quantity learning model based on a power quantity calculated using the power quantity learning model and an actual power quantity consumed by an air conditioner, it is possible to improve accuracy of a result of calculating a power quantity expected to be used in the normal mode during a period of time when the operation mode of the air conditioner 100 is set to a smart operation mode.

In addition, according to various embodiments of the present disclosure, it is possible to correct a result of calculating the power quantity expected to be used in a normal operation mode in consideration of an error range for a result value calculated through a power quantity learning model.

In addition, according to various embodiments of the present disclosure, it is possible to calculate an actual power quantity consumed based on data received from an external device such as a power meter and/or data corresponding to an operation of a predetermined compartment.

In addition, according to various embodiments of the present disclosure, it is possible to manage a history of power quantity usage by updating a database on a power quantity expected to be used and an actual power quantity consumed in a predetermined operation mode.

In addition, according to various embodiments of the present disclosure, it is possible to regulate a flow rate of refrigerant supplied to an indoor unit by using various control algorithms when a smart operation mode is set.

In addition, according to various embodiments of the present disclosure, it is possible to provide various user interfaces related to a power quantity according to a currently set operation mode.

The effects of the present disclosure are not limited to the above-mentioned effects, and other effects not mentioned will be clearly understood by those skilled in the art from the description of the claims.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although operations are illustrated as being performed in a predetermined order in the drawings, it should not be construed that the operations are required to be performed sequentially or in the predetermined order, which is illustrated to obtain a preferable result, or that all of the illustrated operations are required to be performed. In some cases, multi-tasking and parallel processing may be advantageous.

In addition, although the preferred embodiments of the present disclosure have been disclosed for illustrative purposes, those skilled in the art will appreciate that various modifications, additions and substitutions are possible, without departing from the scope and spirit of the present disclosure as disclosed in the accompanying claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner, comprising:
   an outdoor unit having a compressor that compresses a refrigerant;
   at least one indoor unit;
   a storage configured to store a control algorithm previously learned to control a component included in the air conditioner;
   a display; and
   a controller, wherein the controller is configured to:
      in response to the air conditioner being set to a first mode, control either or both of an outdoor unit and at least one indoor unit, regardless of the control algorithm;
      based on first data acquired while the first mode is set, train a power quantity learning model related to an actual power quantity consumed by the air conditioner while the first mode is set;
      in response to the air conditioner being set to a second mode, control either or both of the outdoor unit and the at least one indoor unit based on the control algorithm;
      calculate an estimated power quantity corresponding to the second mode based on second data acquired while the second mode is set and the power quantity learning model, and an actual power quantity consumed by the air conditioner while the second mode is set; and output, on the display, a screen including information on a power quantity saved in the second mode compared to the first mode, based on the estimated power quantity and the actual power quantity consumed by the air conditioner while the second mode is set.

2. The air conditioner of claim 1, wherein the controller is configured to calculate the actual power quantity consumed by the air conditioner based on any one of an operating frequency of the compressor or data on a power quantity consumed by the air conditioner received from an external device.

3. The air conditioner of claim 1, wherein the controller is configured to:

in response to the air conditioner being set to the first mode, acquire the first data for a predetermined time;

calculate an estimated power quantity corresponding to the first mode, using the first data acquired for the predetermined time and the power quantity learning model; and when a difference between the estimated power quantity corresponding to the first mode and an actual power quantity consumed by the air conditioner for the predetermined time is equal to or greater than a present reference amount, train the power quantity learning model based on the first data acquired for the predetermined time.

4. The air conditioner of claim 3, wherein the controller is configured to determine a weight and a bias of the power quantity learning model by learning a correlation between the first data acquired for the predetermined time and the actual power quantity consumed by the air conditioner for the predetermined time.

5. The air conditioner of claim 1, wherein the storage stores a database, and wherein the controller is configured to:

in response to the air conditioner being set to the first mode, add a first estimated power quantity calculated based on the first data acquired for the predetermined time and an actual power quantity consumed by the air conditioner for the predetermined time to the database; and in response to the air conditioner being set to the second mode, add a second estimated power quantity calculated based on the second data acquired for the predetermined time and the actual power quantity consumed by the air conditioner for the predetermined time to the database and delete data added to the database before a preset period from a current point in time from among data included in the database.

6. The air conditioner of claim 5, wherein the controller is configured to, in response to the air conditioner being set to the first mode, calculate the first estimated power quantity calculated based on the first data acquired for the predetermined time as a same value as the actual amount of power consumed by the air conditioner for the predetermined time.

7. The air conditioner of claim 1, wherein the controller is configured to:

determine a minimum value and a maximum value of an estimated power quantity to correspond to a pressure of the refrigerant flowing into the compressor while the second mode is set;

in response to the estimated power quantity being calculated to be less than the minimum value, determine the minimum value as an estimated power quantity corresponding to the second mode; and in response to the estimated power quantity calculated to exceed the maximum value, determine the maximum value as an estimated power quantity corresponding to the second mode.

8. The air conditioner of claim 1, wherein the controller is configured to:

in response to the air conditioner being set to the second mode, determine a cluster for each of the at least one indoor unit; and determine a flow rate of refrigerant supplied to each of the at least one indoor unit based on the cluster for each of the at least one indoor unit and the second data.

9. The air conditioner of claim 8, wherein the controller is configured to determine a total flow rate of refrigerant supplied to the outdoor unit based on a flow rate of the refrigerant supplied to the at least one indoor unit.

10. The air conditioner of claim 1, wherein the controller is configured to:

in response to the air conditioner being set to the second mode, determine whether an initial operation is performed, in response to the initial operation being performed, determine a flow rate of refrigerant supplied to the at least one indoor unit based on a first control algorithm that employs an exponential smoothing method, and in response to the initial operation being not performed, determine the flow rate of refrigerant supplied to the at least one indoor unit based on a second control algorithm that is previously learned regarding a correlation between the second data and the flow rate of the refrigerant.

11. An air conditioner, comprising:

an outdoor unit having a compressor that compresses a refrigerant;

at least one indoor unit;

a storage configured to store a control algorithm previously learned to control of a component included in the air conditioner;

a display; and a controller, wherein the controller is configured to:

in response to the air conditioner being set to a first mode for controlling either or both of the outdoor unit and the at least one indoor unit irrespective of the control algorithm, train a power quantity learning model related to an actual power quantity consumed by the air conditioner;

in response to the air conditioner being set to a second mode for controlling either or both of the outdoor unit and the at least one indoor unit based on the control algorithm, calculate an estimated power quantity based on the power quantity learning model and the actual power quantity consumed by the air conditioner;

calculate a power saving rate regarding a power quantity saved for a predetermined time, based on a ratio of an actual power quantity consumed by the air conditioner for the predetermined time to an estimated power quantity calculated for the predetermined time; and output, on the display, a screen including the actual power quantity consumed by the air conditioner while the second mode is set and at least one of the estimated power quantity or the power saving rate.

12. An air conditioner, comprising:

an outdoor unit having a compressor that compresses a refrigerant;

at least one indoor unit;
a storage configured to store a control algorithm previously learned to control a component included in the air conditioner;
a display; and
a controller, wherein the controller is configured to:
in response to the air conditioner being set to a first mode for controlling either or both of the outdoor unit and the at least one indoor unit irrespective of the control algorithm, train a power quantity learning model related to an actual power quantity consumed by the air conditioner;
output, on the display, a first screen including the actual power quantity consumed by the air conditioner while the first mode is set, in response to the air conditioner being set to a second mode for controlling either or both of the outdoor unit and the at least one indoor unit based on the control algorithm, calculate an estimated power quantity based on the power quantity learning model and the actual power quantity consumed by the air conditioner; and
output, on the display, a second screen including the actual power quantity consumed by the air conditioner while the second mode is set and the estimated power quantity.

13. An operation method of an air conditioner having an outdoor unit and at least one indoor unit, the method comprising:
a first control operation of, while the air conditioner is set to a first mode, controlling either or both of the outdoor unit and the at least one indoor unit, irrespective of a control algorithm previously learned to control a component included in the air conditioner;
a training operation of training, based on first data acquired while the first mode is set, a learning model regarding an actual power quantity consumed by the air conditioner while the first mode is set;
a second control operation of controlling either or both of the outdoor unit and the at least one indoor unit based on the control algorithm when the air conditioner is set to a second mode;
a result calculating operation of calculating an estimated power quantity corresponding to the second mode based on the power quantity learning model and second data acquired while the second mode is set and calculating an actual power quantity consumed by the air conditioner while the second mode is set; and
an information providing operation of outputting, on a display, a screen including information on a power quantity saved in the second mode compared to the first mode, based on the estimated power quantity and the actual power quantity consumed by the air conditioner while the second mode is set.

14. The operation method of claim 13, wherein the result calculating operation comprises an operation of calculating an actual power quantity consumed by the air conditioner based on any one of an operating frequency of the compressor or data on a power quantity consumed by the air conditioner received from an external device.

15. The operation method of claim 13, wherein the training operation comprises:
acquiring the first data for a predetermined time when the air conditioner is set to the first mode;
calculating an estimated power quantity corresponding to the first mode by using the first data acquired for the predetermined time and the power quantity learning model; and
when a difference between the estimated power quantity corresponding to the first mode and an actual power quantity consumed by the air conditioner for the predetermined time is equal to or greater than a present reference amount, training the power quantity learning model based on the first data acquired for the predetermined time.

16. The operation method of claim 15, wherein the training of the power quantity learning model comprises determining a weight and a bias of the power quantity learning model by learning a correlation between the first data acquired for the predetermined time and the actual power quantity consumed by the air conditioner for the predetermined time.

17. The operation method of claim 13, further comprising:
in response to the air conditioner being set to the first mode, adding a first estimated power quantity calculated based on the first data acquired for the predetermined time and an actual power quantity consumed by the air conditioner for the predetermined time to a database;
in response to the air conditioner being set to the second mode, adding a second estimated power quantity calculated based on the second data acquired for the predetermined time and the actual power quantity consumed by the air conditioner for the predetermined time to the database; and
deleting data added to the database before a preset period from a current point in time from among data included in the database.

18. The operation method of claim 17, wherein the adding to the database in consideration of dates and times comprises, in response to the air conditioner being set to the first mode, calculating the first estimated power quantity calculated based on the first data acquired for the predetermined time as a same value as the actual amount of power consumed by the air conditioner for the predetermined time.

19. The operation method of claim 13, wherein the result calculating operation further comprises:
determining a minimum value and a maximum value of the estimated power quantity to correspond to a pressure of the refrigerant flowing into the compressor while the second mode is set;
in response to the estimated power quantity being calculated to be less than the minimum value, determining the minimum value as an estimated power quantity corresponding to the second mode; and
in response to the estimated power quantity calculated to exceed the maximum value, determining the maximum value as the estimated power quantity corresponding to the second mode.

20. The operation method of claim 13, wherein the first control operation comprises:
in response to the air conditioner being set to the second mode, determining a cluster for each of the at least one indoor unit; and
determining a flow rate of refrigerant supplied to each of the at least one indoor unit based on the cluster for each of the at least one indoor unit and the second data.

21. The operation method of claim 20, wherein the second control operation further comprises determining a total flow rate of the refrigerant supplied to the outdoor unit based on a flow rate of the refrigerant supplied to the at least one indoor unit.

22. The operation method of claim 13, wherein the second control operation comprises:

in response to the air conditioner being set to the second mode, determining whether an initial operation is performed;

in response to the initial operation being performed, determining a flow rate of the refrigerant supplied to the at least one indoor unit based on a first control algorithm that employs an exponential smoothing method; and in response to the initial operation being not performed, determining the flow rate of the refrigerant supplied to the at least one indoor unit based on a second control algorithm that is previously learned regarding a correlation between the second data and the flow rate of the refrigerant.

23. An operation method of an air conditioner having an outdoor unit and at least one indoor unit, the method comprising:

in response to the air conditioner being set to a first mode for controlling either or both of the outdoor unit and the at least one indoor unit irrespective of the control algorithm, training a power quantity learning model related to an actual power quantity consumed by the air conditioner;

in response to the air conditioner being set to a second mode for controlling either or both of the outdoor unit and the at least one indoor unit based on the control algorithm, calculating an estimated power quantity based on the power quantity learning model and the actual power quantity consumed by the air conditioner;

calculating a power saving rate regarding a power quantity saved for a predetermined time based on a ratio of an actual power quantity consumed by the air conditioner for the predetermined time to the estimated power quantity calculated for the predetermined time; and outputting, on a display, a screen including the actual power quantity consumed by the air conditioner while the second mode is set and at least one of the estimated power quantity, and the power saving rate.

24. An operation method of an air conditioner having an outdoor unit and at least one indoor unit, the method comprising:

in response to the air conditioner being set to a first mode for controlling either or both of the outdoor unit and the at least one indoor unit irrespective of a control algorithm, training a power quantity learning model related to an actual power quantity consumed by the air conditioner;

outputting, on the display, a first screen including an actual power quantity consumed by the air conditioner while the first mode is set;

in response to the air conditioner being set to a second mode for controlling either or both of the outdoor unit and the at least one indoor unit based on the control algorithm, calculating an estimated power quantity based on the power quantity learning model and an actual power quantity consumed by the air conditioner; and outputting, on the display, a second screen including the actual power quantity consumed by the air conditioner while the second mode is set and the estimated power quantity.

* * * * *